(12) United States Patent
Umeya et al.

(10) Patent No.: US 8,134,660 B2
(45) Date of Patent: Mar. 13, 2012

(54) OPTICAL DIFFUSION DEVICE, PROJECTION SCREEN, DESIGN MEMBER AND SECURITY MEDIUM

(75) Inventors: Masanori Umeya, Matsudo (JP); Masachika Watanabe, Koutou-Ku (JP); Minoru Azakami, Kashiwa (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 206 days.

(21) Appl. No.: 12/281,539

(22) PCT Filed: Mar. 13, 2007

(86) PCT No.: PCT/JP2007/054943
§ 371 (c)(1),
(2), (4) Date: Sep. 3, 2008

(87) PCT Pub. No.: WO2007/105721
PCT Pub. Date: Sep. 20, 2007

(65) Prior Publication Data
US 2009/0059158 A1  Mar. 5, 2009

(30) Foreign Application Priority Data
Mar. 13, 2006 (JP) ................... 2006-067739

(51) Int. Cl.
*G02F 1/1335* (2006.01)
*G03B 21/60* (2006.01)
(52) U.S. Cl. .................... 349/112; 359/456
(58) Field of Classification Search .......... 349/112, 349/179, 185; 359/456–457
See application file for complete search history.

(56) References Cited

U.S. PATENT DOCUMENTS

| | | | | |
|---|---|---|---|---|
| 3,843,231 A * | 10/1974 | Borel et al. | .................... | 349/202 |
| 6,172,792 B1 * | 1/2001 | Jepsen et al. | .................. | 359/254 |
| 6,310,671 B1 * | 10/2001 | Larson | ........................... | 349/96 |
| 6,361,838 B1 * | 3/2002 | Miyatake et al. | ............. | 428/1.31 |
| 6,369,945 B1 * | 4/2002 | Sakuramoto et al. | ......... | 359/494 |
| 6,392,802 B2 * | 5/2002 | Miyatake et al. | ............. | 359/494 |
| 6,665,028 B2 * | 12/2003 | Nakanishi et al. | ............ | 349/112 |
| 6,690,500 B2 * | 2/2004 | Ogasawara et al. | ........... | 359/245 |
| 6,734,932 B2 * | 5/2004 | Nakanishi et al. | ............ | 349/112 |
| 6,850,295 B1 * | 2/2005 | Miyatake et al. | ............. | 349/112 |
| 6,882,482 B2 * | 4/2005 | Ogasawara | .................... | 359/665 |
| 6,906,764 B2 * | 6/2005 | Kashima et al. | ................ | 349/98 |
| 6,987,598 B2 * | 1/2006 | Wada et al. | .................... | 359/254 |
| 7,034,980 B2 * | 4/2006 | Wada et al. | .................... | 359/254 |
| 7,161,737 B2 * | 1/2007 | Umeya | .......................... | 359/454 |

(Continued)

FOREIGN PATENT DOCUMENTS

JP         2001-004834 A1        1/2001

(Continued)

*Primary Examiner* — Rhonda Peace
(74) *Attorney, Agent, or Firm* — Burr & Brown

(57) ABSTRACT

The present invention provides an optical diffusion device, which can exhibit discontinuously different optical properties only in desired regions without creating any difference in grades and/or breaks, facilitate control of the optical diffusion properties, and prevent the occurrence of the stray light, as well as provides a projection screen and a design member, both using the optical diffusion device. An exemplary optical diffusion device according to this invention includes a base, and a cholesteric liquid crystal polymer layer provided on the base and composed of a plurality of diffusion regions arranged on a plane. A diffusion angle of one of the diffusion regions (e.g., first diffusion regions) of the cholesteric liquid crystal polymer layer is different from a diffusion angle of another of the diffusion regions (e.g., second diffusion regions).

19 Claims, 9 Drawing Sheets

U.S. PATENT DOCUMENTS

| | | | |
|---|---|---|---|
| 7,193,777 B2 * | 3/2007 | Umeya | 359/459 |
| 7,221,515 B2 * | 5/2007 | Kurt et al. | 359/639 |
| 2002/0024688 A1 * | 2/2002 | Ogasawara et al. | 359/16 |
| 2002/0075434 A1 * | 6/2002 | Jiang et al. | 349/129 |
| 2004/0008391 A1 * | 1/2004 | Bowley et al. | 359/3 |
| 2006/0227283 A1 * | 10/2006 | Ooi et al. | 349/201 |
| 2006/0279843 A1 * | 12/2006 | Kurt et al. | 359/558 |
| 2007/0020404 A1 | 1/2007 | Seiberle et al. | |
| 2007/0183020 A1 * | 8/2007 | Hikmet | 359/279 |
| 2009/0033814 A1 * | 2/2009 | Khan | 349/35 |

FOREIGN PATENT DOCUMENTS

| | | |
|---|---|---|
| JP | 2001-228548 A1 | 8/2001 |
| JP | 2002-090527 A1 | 3/2002 |
| JP | 2003-512641 | 4/2003 |
| JP | 2004-178546 | 6/2004 |
| JP | 2004-302075 | 10/2004 |
| JP | 2005-003823 A1 | 1/2005 |
| JP | 2005-010432 A1 | 1/2005 |
| JP | 2005-017405 A1 | 1/2005 |
| JP | 2005-017751 A1 | 1/2005 |
| JP | 2005-037735 A1 | 2/2005 |
| JP | 2005-037807 A1 | 2/2005 |
| JP | 2005-107296 A1 | 4/2005 |
| JP | 2005-164708 A1 | 6/2005 |
| JP | 2006-024519 | 1/2006 |
| JP | 2006-063122 | 3/2006 |

* cited by examiner

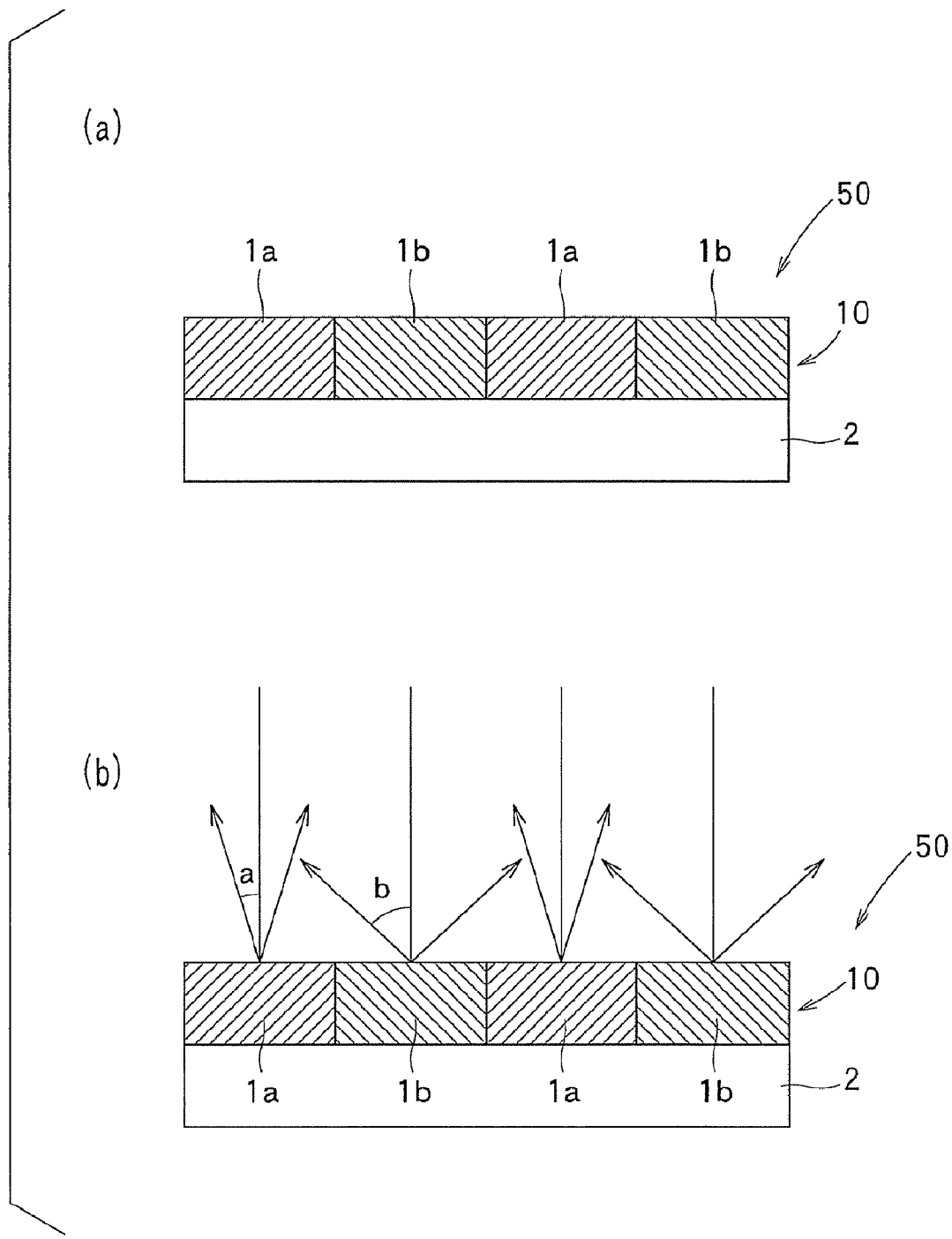
F I G . 1

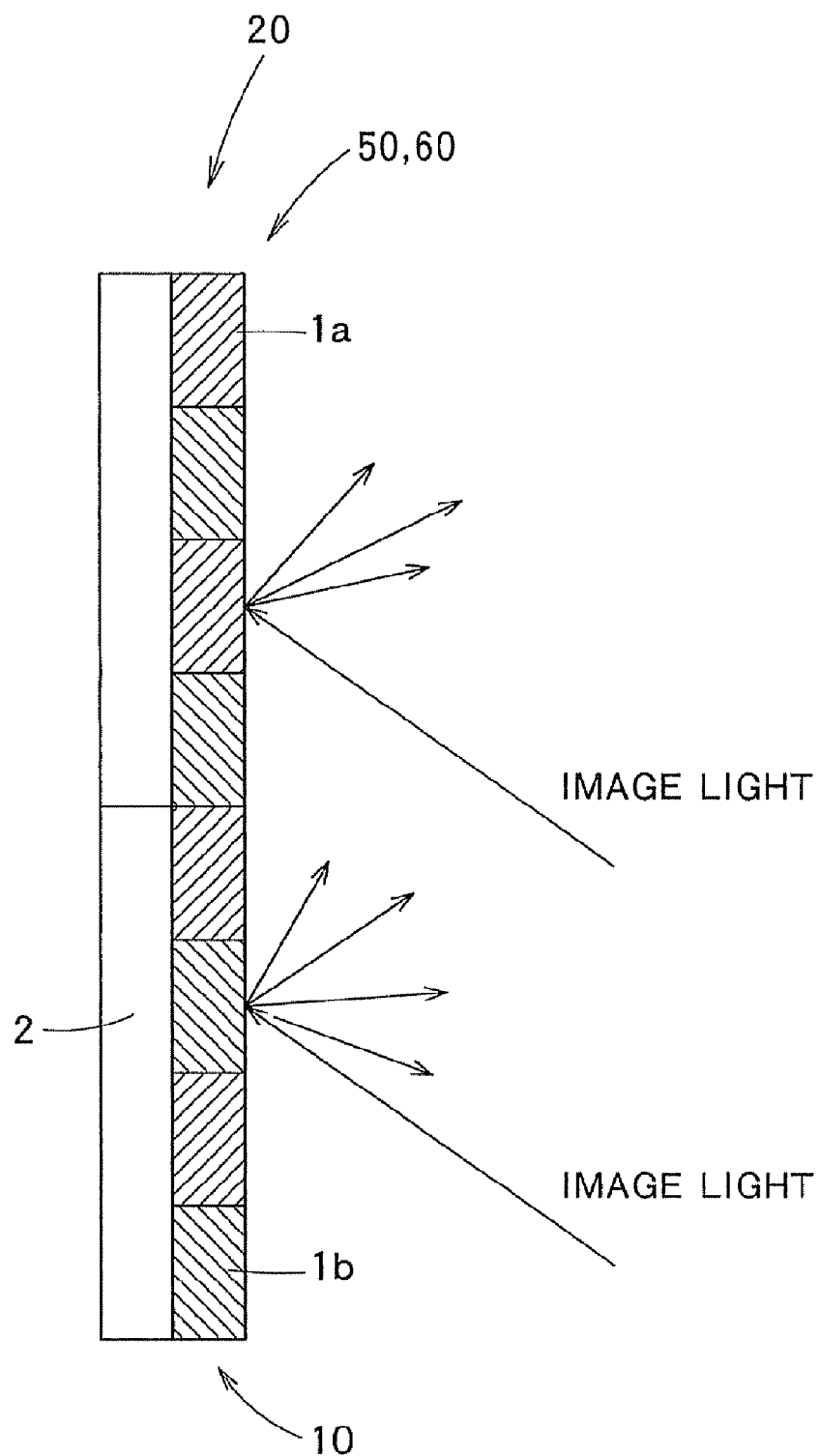
F I G . 7

OPTICAL DIFFUSION DEVICE, PROJECTION SCREEN, DESIGN MEMBER AND SECURITY MEDIUM

BACKGROUND OF THE INVENTION

1. Field of the Invention

The present invention relates to an optical diffusion device adapted for controlling diffusion properties, and also relates to a projection screen, a design member and a security medium, which use the optical diffusion device, respectively.

2. Background Art

As a conventional optical diffusion device composed of a liquid crystal polymer, an optical compensation device, an optical reflection device and an optical phase difference device, respectively using a nematic liquid crystal, a cholesteric liquid crystal, a discotic liquid crystal and the like, have been known. Such devices are generally utilized as the optical diffusion devices, such as liquid crystal panel displays, security members, optical measuring devices, optical parts, liquid crystal projectors, rear-projection televisions, projection screens and the like.

Of these devices, the optical reflection device is representative of the optical diffusion devices with a structure of cholesteric orientation. Specifically, such an optical diffusion device is utilized as a polarized-light separating reflection device in a liquid crystal display member or as a color filter, or otherwise utilized as a negative C-plate optical compensation device or the like.

As the projection screen, a polarizing screen using the cholesteric liquid crystal has been known. In recent years, screens and reflectors for the LCD, using a cholesteric liquid crystal polymer layer configured for controlling the diffusion properties, have been known.

In the optical diffusion device using such a cholesteric liquid crystal polymer layer, a method for improving luminance distribution and viewing angle properties has been known, in which the cholesteric liquid crystal polymer layers, respectively having different viewing angle properties, are arranged in a thickness direction (e.g., see Patent Document 1).

Patent Document 1: JP 2005-107296 (TOKUKAI No. 2005-107296)

However, in such construction having the cholesteric liquid crystal polymer layers laminated therein, it is quite difficult to obtain the optical diffusion device that can exhibit discontinuously different optical properties only in desired regions, as seen in patterning, without creating any difference in grades and/or breaks.

Additionally, in such a prior art construction, each laminated cholesteric liquid crystal polymer layer is configured for diffusing and reflecting light of the same wavelength range. Thus, the remaining light other than the light reflected by the cholesteric liquid crystal polymer layer located on a front side will be reflected by the cholesteric liquid crystal polymer layer located on a rear side. Therefore, optical diffusion due to each cholesteric liquid crystal polymer layer depends on the film thickness of the cholesteric liquid crystal polymer layer. This makes it difficult to adequately control the optical diffusion properties over the entire system. Furthermore, in some cases, a part of incident light is likely to be repeatedly reflected between the cholesteric liquid crystal polymer layer located on the front side and the cholesteric liquid crystal polymer layer located on the rear side, leading to occurrence of a stray light.

SUMMARY OF THE INVENTION

The present invention was made in light of such circumstances, and it is therefore an object of this invention to provide a new optical diffusion device which can exhibit discontinuously different optical properties only in desired regions without creating any difference in grades and/or breaks, facilitate control of the optical diffusion properties, and prevent the occurrence of the stray light. Another object of this invention is to provide a new projection screen and a new design member, which use such an inventive optical diffusion device, respectively.

An optical diffusion device according to the present invention comprises:

a base material; and a cholesteric liquid crystal polymer layer provided on the base material and composed of a plurality of diffusion regions arranged on a plane, wherein a diffusion angle of one of the diffusion regions of the cholesteric liquid crystal polymer layer is different from a diffusion angle of another of the diffusion regions.

In the optical diffusion device according to this invention, the diffusion regions of the cholesteric liquid crystal polymer layer are created by providing a process for changing diffusion controlling ability of the base material to portions, corresponding to the diffusion regions, in the base material, prior to providing the cholesteric liquid crystal polymer layer on the portions.

In the optical diffusion device according to this invention, the diffusion regions of the cholesteric liquid crystal polymer layer are created by providing a process for changing a diffusion angle of the cholesteric liquid crystal polymer layer, to portions, corresponding to the diffusion regions, in the cholesteric liquid crystal polymer layer provided on the base material.

The optical diffusion device according to this invention may further comprising a diffusion control layer located between the base material and the cholesteric liquid crystal polymer layer, and adapted for controlling the diffusion angle of the diffusion regions.

The optical diffusion device according to this invention may further comprising a diffusion control layer located at portions corresponding to the one of the diffusion regions, between the base material and the cholesteric liquid crystal polymer layer, and adapted for controlling the diffusion angle of the diffusion regions.

In the optical diffusion device according to this invention, a plurality of diffusion control layers are laminated between the base material and the cholesteric liquid crystal polymer layer.

In the optical diffusion device according to this invention, the diffusion controlling ability of the laminated diffusion control layers is different relative to one another.

In the optical diffusion device according to this invention, a plurality of cholesteric liquid crystal polymers are laminated.

In the optical diffusion device according to this invention, one of the cholesteric liquid crystal polymer layers is adapted for diffusing and reflecting light having a central wavelength different from a central wavelength diffused and reflected by another of the cholesteric liquid crystal polymer layers.

In the optical diffusion device according to this invention, one of the cholesteric liquid crystal polymer layers is adapted for diffusing and reflecting light of a polarized component different from a polarized component diffused and reflected by another of the cholesteric liquid crystal polymer layers.

Alternatively, a projection screen according to the present invention includes either one aspect of the optical diffusion device described above.

Alternatively, a design member according to the present invention includes either one aspect of the optical diffusion device described above.

A projection screen including an optical diffusion device according to this invention,
wherein the optical diffusion device comprises a base material, and a cholesteric liquid crystal polymer layer provided on the base material and composed of a plurality of diffusion regions arranged on a plane, wherein a diffusion angle of one of the diffusion regions of the cholesteric liquid crystal polymer layer is different from a diffusion angle of another of the diffusion regions.

A design member including an optical diffusion device according to this invention,
wherein the optical diffusion device comprises a base material, and a cholesteric liquid crystal polymer layer provided on the base material and composed of a plurality of diffusion regions arranged on a plane, wherein a diffusion angle of one of the diffusion regions of the cholesteric liquid crystal polymer layer is different from a diffusion angle of another of the diffusion regions.

The optical diffusion device according to this invention may further comprising an orienting film located between the base material and the cholesteric liquid crystal polymer layer, and subjected to a rubbing process.

In the optical diffusion device according to this invention, an adhesion-facilitating process is provided to a surface of the base material on the side of the cholesteric liquid crystal polymer layer, so that the surface of the base material can exhibit adhesion-facilitating properties.

The optical diffusion device according to this invention may further comprising an optically anisotropic layer located between the base material and the cholesteric liquid crystal polymer layer, and including portions, corresponding to the one of the diffusion regions, exposed to light.

The optical diffusion device according to this invention may further comprising a diffusion control layer located between one of the collesteric liquid crystal polymer layers and another of the chollesteric liquid crystal polymer layers, and adapted for controlling the diffusion angle of the diffusion regions.

The optical diffusion device according to this invention may further comprising the diffusion control layer located at portions corresponding to the one of the diffusion regions, between the one of the cholesteric liquid crystal polymer layers and another of the cholesteric liquid crystal polymer layers, and adapted for controlling the diffusion angle of the diffusion regions.

A security medium including an optical diffusion device according to this invention,
wherein the optical diffusion device comprises a base material, and a cholesteric liquid crystal polymer layer provided on the base material and composed of a plurality of diffusion regions arranged on a plane, and wherein a diffusion angle of one of the diffusion regions of the cholesteric liquid crystal polymer layer is different from a diffusion angle of another of the diffusion regions.

According to this invention, the optical diffusion device can be provided, which can exhibit discontinuously different optical properties only in desired regions without creating any difference in grades and/or breaks, facilitate control of the optical diffusion properties, and prevent the occurrence of the stray light. In addition, the projection screen and design member, both using such an inventive optical diffusion device, can also be provided.

BRIEF DESCRIPTION OF THE DRAWINGS

FIG. 1 is a schematic cross section showing a first embodiment of the optical diffusion device according to the present invention.

FIG. 7 is a schematic cross section showing the projection screen using the optical diffusion device according to the present invention.

DESCRIPTION OF REFERENCE NUMERALS USED IN THE DRAWINGS

1$a$, 1$a$B, 1$a$G, 1$a$R, 1$a$Br 1$a$G1, 1$a$Rr: First diffusion regions;
1$b$, 1$b$B, 1$b$G, 1$b$R, 1$b$Br, 1$b$G1, 1$b$Rr: Second diffusion regions;
2: Base material;
2': Glass substrate (base material);
2": Non-oriented PET substrate (base material);
2$e$": PET substrate subjected to an adhesion-facilitating process;
3, 3$a$, 3$b$: Diffusion control layers;
3': PETA layer (diffusion control layer);
10: Cholesteric liquid crystal polymer layer;
11: First cholesteric liquid crystal polymer layer;

12: Second cholesteric liquid crystal polymer layer;
13: Third cholesteric liquid crystal polymer layer;
20: Projection screen;
30: Design member;
40: Security medium (card);
50: Optical diffusion device;
60: Reflection layer:
82: Orienting layer;
85: Optically anisotropic layer;
85a: Part exposed to light, in the optically anisotropic layer; and
85b: Part not exposed to light, in the optically anisotropic layer.

DETAILED DESCRIPTION OF THE INVENTION

First Embodiment

Figure 2:
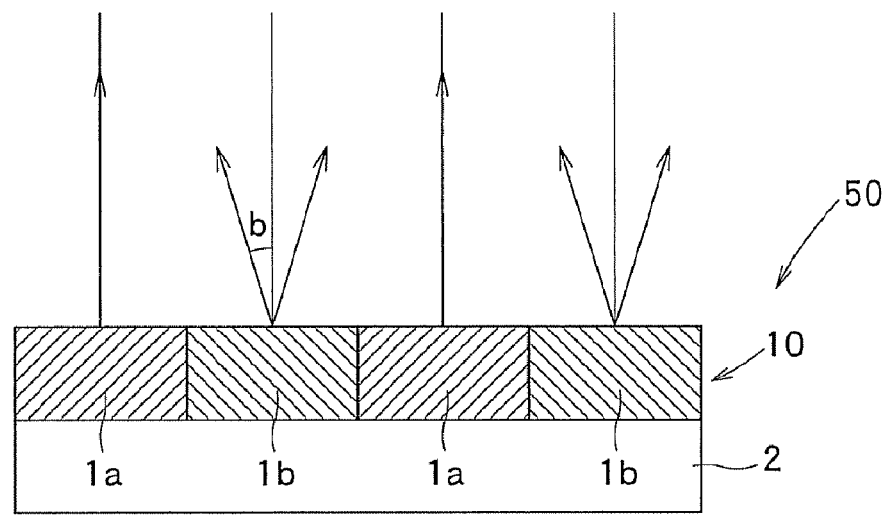
FIG. 2 is a schematic cross section showing a variation of the first embodiment of the optical diffusion device according to the present invention.

Hereinafter, a first embodiment of the optical diffusion device according to the present invention will be described, with reference to the drawings. FIGS. 1(a), 1(b) and 2 are provided to respectively illustrate the first embodiment of this invention.

As shown in FIGS. 1(a) and 1(b), an exemplary optical diffusion device 50 includes a base material 2 and a cholesteric liquid crystal polymer layer 10 provided on the base material 2 and composed of a plurality of diffusion regions (first diffusion regions 1a and second diffusion regions 1b) arranged on a flat plane. Of these components, the diffusion angle of one of the diffusion regions (e.g., the first diffusion regions 1a) of the cholesteric liquid crystal polymer layer 10 is different from the diffusion angle of another of the diffusion regions (e.g., the second diffusion regions 1b). As used herein, the term "one of the diffusion regions" means unspecified one group of the diffusion regions, and the term "another of the diffusion regions" means another group of the diffusion regions than the one group of the diffusion regions. In this embodiment, for the illustrative purpose, the one of the diffusion regions will be referred to as the first diffusion regions 1a and another of the diffusion regions will be referred to as the second diffusion regions 1b.

As shown in FIG. 1, the cholesteric liquid crystal polymer layer 10 includes the first diffusion regions 1a each adapted for providing the diffusion angle of ±a, and the second diffusion regions 1b each adapted for providing the diffusion angle of ±b. As apparently seen from FIG. 1, the relation between the two angles a and b can be expressed by b>a≧0.

The "diffusion angle" is defined herein as an angle at which the intensity of reflection (or reflection intensity), measured at a certain angle, of light reflected in directions other than a regular reflection direction is a third (⅓) of the reflection intensity in the regular reflection direction, on the basis of the reflection intensity at an output angle of the regular reflection direction relative to an input angle of incident light. The diffusion angle will be described and/or shown with a plus and minus sign (e.g., ±a or ±b) on the assumption that the regular reflection direction in a plane including both inputted and outputted light is expressed as zero (0).

The cholesteric liquid crystal polymer layer 10 contains a large number of spiral liquid crystal domains. The diffusion properties of each diffusion region 1a, 1b depend on a direction and a degree of scattering of an axis of the spiral (or spiral axis) of each liquid crystal domain. With a greater degree of scattering of the spiral axis of each liquid crystal domain, the incident or inputted light can be diffused in a wider range (or in a wider diffusion mode). Meanwhile, in the case in which the spiral axis of each liquid crystal domain is oriented in approximately the same direction, the incident light will be diffused in a relatively narrow range (or in a narrower diffusion mode). The polarization properties of each diffusion region 1a, 1b depend on a winding or turning direction of the spiral of each liquid crystal domain. Generally, when the winding direction of the spiral of each liquid crystal domain is clockwise, such a domain reflects right-handed circularly-polarized light while allowing left-handed circularly-polarized light to permeate therethrough. Meanwhile, when the winding direction of the spiral of each liquid crystal domain is counter-clockwise, such a domain reflects the left-handed circularly-polarized light while allowing the right-handed circularly-polarized light to permeate therethrough. On a method for controlling the diffusion properties of the cholesteric liquid crystal polymer layer 10, those disclosed in JP2005-010432A, JP2005-017751A, JP2005-017405A, JP2005-037807A, and JP2005-037735A are known.

The diffusion angle of each diffusion region 1a, 1b can be controlled by controlling orienting properties (or diffusion controlling ability) of the base material 2. The orienting properties of the base material 2 in turn can be controlled by modifying a surface of the base material 2. It should be appreciated that the surface of the base material 2 can be modified with a surface process, such as by a plasma process, a corona process, a UV irradiation or the like.

For example, in the case in which an acryl-type cholesteric liquid crystal is coated on the acryl-type base material 2, the orienting properties for the acryl-type cholesteric liquid crystal can be enhanced, thereby obtaining the cholesteric liquid crystal polymer layer 10 having narrower diffusion properties. Whether obtaining the cholesteric liquid crystal polymer layer 10 having narrower diffusion properties or obtaining the cholesteric liquid crystal polymer layer 10 having wider diffusion properties depends on affinity between a material from which the base material 2 is made and characteristics of the cholesteric liquid crystal coated on the base material 2.

Next, operation of this embodiment having the construction as described above will be discussed.

First, a method for producing an optical diffusion device 50 related to this embodiment will be described.

First of all, the base material 2 is prepared. Then, a predetermined portion or portions of the base material 2 are subjected to the UV irradiation. In this way, the orienting properties (or diffusion controlling ability) of such UV-irradiated portions of the base material 2 can be changed.

Thereafter, a cholesteric liquid crystal polymer liquid is coated on the base material 2. Subsequently, the cholesteric liquid crystal polymer liquid coated on the base material 2 is cured to obtain the cholesteric liquid crystal polymer layer 10.

In this case, the cholesteric liquid crystal polymer layer 10 located on each portion of the base material 2 that has been subjected to the UV irradiation will exhibit wider diffusion properties, so as to create each second diffusion region 1b. On the other hand, the cholesteric liquid crystal polymer layer 10 located on each portion of the base material 2 that has not been subjected to the UV irradiation will have the narrower diffusion properties, so as to create each first diffusion region 1a.

According to the optical diffusion device 50 of the embodiment described above, a state in which the cholesteric liquid crystal is oriented can be controlled by changing the orienting properties (or diffusion controlling ability) of the predetermined portions of the base material 2. Thus, the diffusion angle of each second diffusion region 1b of the cholesteric liquid crystal polymer layer 10 can be changed, thereby to provide the first diffusion regions 1a and second diffusion regions 1b, respectively having different diffusion angles relative to each other, in the same plane.

Accordingly, the optical diffusion device 50 that can exhibit discontinuously different optical properties only in desired regions, as seen in patterning, without creating any difference in grades and/or breaks between the respective diffusion regions 1a, 1b can be obtained. Unlike the case of laminating the cholesteric liquid crystal polymer layers 10 respectively having different diffusion angles in the same wavelength range, the diffusion angle does not depend on the film thickness of each cholesteric liquid crystal polymer layer 10. Therefore, in this embodiment, the diffusion properties of each cholesteric liquid crystal polymer layer 10 can be controlled with ease. In addition, since the optical diffusion device 50 includes no cholesteric liquid crystal polymer layers 10 laminated therein, which reflect the light of the same wavelength range, the occurrence of the stray light can be avoided.

As shown in FIG. 2, each first diffusion region 1a of the cholesteric liquid crystal polymer layer 10 may provide mirror reflection to the incident light so as to create reflected light only in the regular reflection direction. Such a cholesteric liquid crystal polymer layer 10 can be obtained by first providing a rubbing process only to the portion corresponding to each first diffusion region 1a of the base material 2 and then coating and curing the cholesteric liquid crystal thereon. It is noted that there is no need to provide any process to the portion corresponding to each second diffusion region 1b of the base material 2.

In this embodiment, the diffusion angle of the second diffusion regions 1b is changed in order to obtain the respective diffusion regions 1a, 1b exhibiting different diffusion properties relative to each other (i.e., narrower diffusion properties and wider diffusion properties, mirror reflection properties and diffusion reflection properties, and the like). As a means for changing the diffusion angle of the second diffusion regions 1b, one example, for controlling the state in which the cholesteric liquid crystal is oriented by providing a process for changing the orienting properties (or diffusion controlling ability) to the base material 2, has been discussed above (see FIGS. 1(a), 1(b)). Such a means, however, is not limited to this aspect. For instance, another process for changing the diffusion angle may be provided to the portions respectively corresponding to the second diffusion regions 1b in the cholesteric liquid crystal polymer layer 10 provided on the base material 2.

For instance, the cholesteric liquid crystal polymer layer 10 is first prepared by coating and curing the cholesteric liquid crystal on the base material 2 to which no process has been provided.

Thereafter, the diffusion angle of the second diffusion regions 1b can be changed either by modifying the surface by providing a heating process to each portion corresponding to each second diffusion region 1b or by physically changing a profile of the surface of each portion corresponding to each second diffusion region 1b. As such, the diffusion regions 1a, 1b having different diffusion properties relative to each other can be obtained.

Next, a method for allowing the optical diffusion device 50 to exhibit anisotropic properties will be described in detail. It is noted that a part of this method of this invention that is common to a generally known method is similar to one described in JP2005-3823A and hence will be omitted herein.

First of all, uncured cholesteric liquid crystal is coated and cured as described in the JP2005-3823A, and is then heated up to an isotropic-phase temperature, thereby bringing the cholesteric liquid crystal into an isotropic phase.

Thereafter, the temperature of the base material 2 is lowered below a cholesteric-phase temperature, as such bringing the cholesteric liquid crystal into a cholesteric phase. During this period of changing the temperature, a gas is injected in one direction to be blown against the cholesteric liquid crystal. By bringing the cholesteric liquid crystal into the cholesteric phase while keeping it in such a state, the direction of the spiral axis of each liquid crystal domain will be inclined along the flowing direction of the injected gas.

In the case in which an orienting film is provided on the surface of the base material 2, the spiral axis of each liquid crystal domain will be inclined while holding the mirror reflection properties as well as keeping the same orientation. Meanwhile, in the case in which the surface of the base material 2 is composed of a non-oriented surface, a principal direction of the spiral axis of each liquid crystal domain will be inclined while holding the diffusion reflection properties as well as keeping variation of the spiral axes to some extent. This phenomenon is a kind of sharing orientation, which can optionally control the inclination of the spiral axis of each liquid crystal domain by controlling the flow rate, direction and angle of the injected gas. Furthermore, with proper control of the gas for each portion on the surface of the base material 2, a plurality of regions respectively having different principal directions of the spiral axes of the liquid crystal domains can be created in the same plane of one cholesteric liquid crystal polymer layer 10.

At the temperature lower than the cholesteric-phase temperature, the inclined spiral axis of each liquid crystal domain is maintained for a certain time. Therefore, even after the gas injection is stopped, such an inclined spiral axis of each liquid crystal domain can be fixed by polymerizing the liquid crystal, such as by providing a curing process, e.g., UV irradiation or the like, thereto. In this way, the anisotropic properties can be provided to the optical diffusion device 50.

Now, each component of the optical diffusion device 50 will be further detailed.

First of all, the cholesteric liquid crystal polymer layer 10 will be described in more detail.

Preferably, a cholesteric liquid crystal structure of the cholesteric liquid crystal polymer layer 10 has a particular spiral pitch length that can allow the polymer layer 10 to selectively reflect light of a particular wavelength range covering only a part of a visible-light range (e.g., a wavelength range of from 380 to 780 nm). More specifically, it is preferred that the cholesteric liquid crystal structure of the cholesteric liquid crystal polymer layer 10 has at least two kinds of spiral pitch lengths, which are discontinuously different from each other, such that each of the spiral pitch lengths can allow the polymer layer 10 to selectively reflect only light of each particular wavelength range corresponding to each wavelength range of image light projected from a projector, such as a liquid crystal projector.

As used herein, the term "spiral pitch length" means a thickness of each repeated layer exhibiting Bragg reflection in the laminated film.

Generally, light of the wavelength ranges 430 to 470 nm, 530 to 570 nm and 580 to 640 nm is used as the light for the red color (R), green color (G) and blue color (B), respectively. These three primary colors of light, (R), (G) and (B), can create together the white color and are utilized for color filters and/or light sources used for display devices. Each of the red color (R), green color (G) and blue color (B) is expressed as a bright line having a peak of a particular wavelength (e.g., 550 nm is representative for the blue color (G)). However, such a bright line has a certain width or range, and the wavelength thereof will vary with modes for designing devices and/or types of light sources. Accordingly, it is preferred to provide a wavelength bandwidth of 30 to 40 nm for each color of each light. It should be appreciated that if the wavelength range of each light for the red color (R), green color (G) and blue color (B) is set out of the aforementioned range, such colors of light would not create together the white color. Instead, the resultant white color in such a case would be yellowish white or reddish white. Meanwhile, in the case of displaying each of the red color (R), green color (G) and blue color (B) of light with an independently selective reflection wavelength range, it is preferred that the cholesteric liquid crystal structure of the cholesteric liquid crystal polymer layer 10 has three kinds of spiral pitch lengths that are discontinuously different from one another. However, in some cases, the wavelength ranges of the red color (R) and green color (G) are included together in a wavelength bandwidth of the selective reflection wavelength range of one spiral pitch length. In this case, it is preferred that the cholesteric liquid crystal structure has two kinds of spiral pitch lengths different relative to each other.

It is should be noted that in the case in which the cholesteric liquid crystal structure of the cholesteric liquid crystal polymer layer 10 has discontinuously different two or more kinds of spiral pitches, such a cholesteric liquid crystal polymer layer 10 can be constructed by laminating at least two partially selective reflection layers, each having a different spiral pitch length, one on another.

Next, the base material 2 will be described.

The base material 2 is provided for supporting the cholesteric liquid crystal polymer layer 10. Various materials, such as plastic films, metal, paper, fabric, glass and the like may be used for the base material 2, provided that such a material can permit the coating of the liquid crystal material thereon.

The base material 2 may include a light absorbing layer adapted for absorbing the light within the visible-light range. More specifically, the base material 2 may be formed from an acryl plate or plastic film (e.g., a black PET film in which carbon is kneaded) (in this case, the whole body of the base material 2 will be the light absorbing layer (or light absorbing substrate)). Otherwise, the light absorbing material may be formed by coating or attaching a black pigment or the like material onto a surface on either side of an optically transparent base film, such as a plastic film. In this way, the light, the reflection of which should be prevented as much as possible, among non-polarized light coming in from an observer side relative to a projection screen 20, and/or light coming in from a rear face of the projection screen 20 can be absorbed successfully, thereby effectively preventing occurrence of reflected light attributable to environmental light, such as natural light, illumination light and the like, and/or occurrence of the stray light caused by image light.

As the plastic film used for the base material 2, various films formed from thermoplastic polymers, such as polycarbonate-type polymers; polyester-type polymers, such as polyethylene terephthalate; polyimide-type polymers; polysulfone-type polymers; polyether-sulfone-type polymers; polystyrene-type polymers; polyolefin-type polymers, such as polyethylene and polypropylene; polyvinyl-alcohol-type polymers; cellurose-acetate-type polymers; polyvinyl-chloride-type polymers; polyacrylate-type polymers; polymethymethacrylate-type polymers, can be used. It should be appreciated that the material for the base material 2 is not limited to those mentioned above, other materials, such as metal, paper, fabric, glass and the like, can also be used.

The base material 2 may have any suitable transmissivity, and it may have optical transparency. Similarly, any suitable color, such as a red color or blue color, can be used, provided that it is optically transparent.

A suitable functionality holding layer (not shown) may be provided as needed on the surface of the optical diffusion device 50. As the functionality holding layer, various layers can be used. For example, hard coat layers (HC layers), anti-reflection layers (AF layers), antiglare layers (AG layers), ultraviolet-ray absorbing layers (UV absorbing layers), antistatic layers (AS layers), and the like can be mentioned.

The hard coat layer (HC layer) is used for protecting the surface of the screen in order to prevent damage and attachment of dirt thereto. The antireflection layer (AR layer) is used for controlling surface reflection of light on the surface of a double-use screen. The ultraviolet-ray absorbing layer is used for absorbing ultraviolet components of the incident light that may cause the liquid crystal composition to be changed into a yellow color. The antistatic layer (AS layer) is used for removing static electricity generated on the screen.

Preferably, such a functionality holding layer as described above has a smaller haze value and higher optical transparency. Desirably, such a functionality holding layer exhibits smaller double refraction and has properties that will not change a polarized state of the light passing therethrough. However, in the case in which the functionality holding layer is also used as a phase-difference layer, it may have some double refraction properties.

In regard to the AG layer, it is preferred that the haze value is 50 or less. If the haze value is greater than 50, light scattering will be unduly increased, as such causing the natural light including illumination light to be excessively scattered, thus making it difficult to obtain a higher contrast in a bright room. On the other hand, with the AG layer having the haze value less than 50, the impact of the natural light can be adequately controlled and occurrence of images of weak light projected onto the screen can be avoided, making it possible to provide acceptable image quality. Preferably, the haze value is less than 20, more preferably within a range of from 1 to 10.

Second Embodiment

Next, a second embodiment of the present invention will be described with reference to FIGS. 3(a), 3(b) and 4. The second embodiment shown in FIGS. 3(a), 3(b) and 4 includes a diffusion control layer 3 provided between the base material 2 and the cholesteric liquid crystal polymer layer 10 and adapted for controlling the diffusion angle of each diffusion layer 1a, 1b. The other construction of the second embodiment is substantially the same as that of the first embodiment shown in FIGS. 1(a), 1(b) and 2.

In the second embodiment shown in FIGS. 3(a), 3(b) and 4, like parts in the first embodiment shown in FIGS. 1(a), 1(b) and 2 will be respectively designated by like reference numerals, and description on those parts will be omitted below.

In the second embodiment, the diffusion control layer 3, the orienting properties (or diffusion control ability) of which is controlled in advance in each portion corresponding to each second diffusion region 1b, is arranged on the base material 2. Thus, only by coating and curing the cholesteric liquid crystal polymer liquid on the diffusion control layer 3, the diffusion angle of each second diffusion region 1b of the cholesteric liquid polymer layer 10 can be changed (see FIG. 3(a)). Therefore, the optical diffusion device 50 having diffusion angles different in the respective diffusion regions 1a, 1b can be readily obtained. It should be noted that no process for controlling the orienting properties is provided to the portions respectively corresponding to the first diffusion regions 1a.

Figure 3:
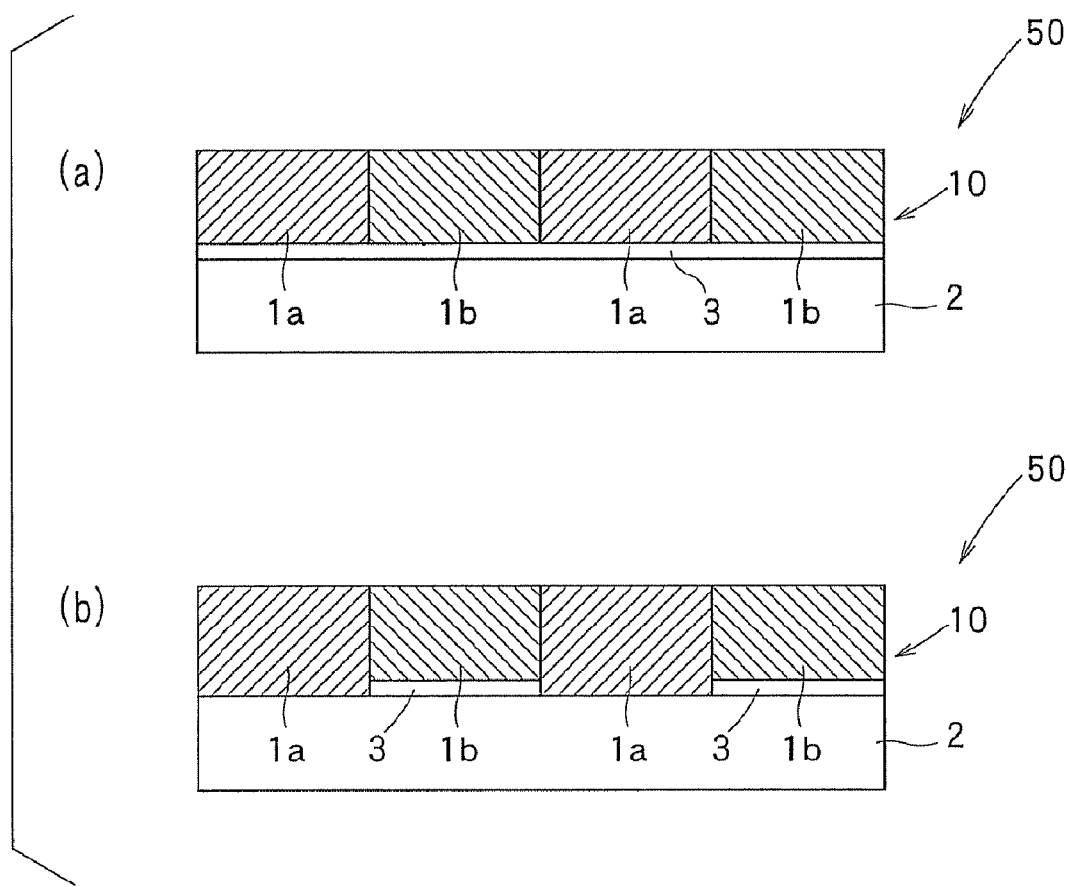
FIG. 3 is a schematic cross section showing a second embodiment of the optical diffusion device according to the present invention.

As shown in FIG. 3(b), the diffusion control layers 3, each for controlling the diffusion angle of each second diffusion region 1b, may be provided to only the portions respectively corresponding to the second diffusion regions 1b, between the base material 2 and the choresteric liquid crystal polymer layer 10. Especially, in the case in which the diffusion control layer 3 composed of a material different from the base material 2 is used, the material of the diffusion control layer 3 has in nature the orienting properties different from the base material 2. Therefore, only by forming and arranging the diffusion control layers 3, respectively, the second diffusion regions 1b, each having the diffusion properties different from those of the first diffusion regions 1a that are directly arranged onto the base material 2, can be readily obtained.

As the material used for the diffusion control layer 3, it is preferable to use one having solvent resistance. Further, it is more preferable to use such a material that can be polymerized, by heat curing and/or electron beam curing, after film formation. Alternatively, the diffusion control layer 3 may be formed from a film that is produced by coating a high-molecular material dissolved in a solvent onto the base material 2 and then removing the solvent. In this case, however, the liquid crystal which will be laminated next, a solution of the liquid crystal, the material for the diffusion control layer or a solvent contained therein, should have a proper resistance. For example, monofunctional acrylates or methacrylates, such as polyethylene glycol mono(meth)acrylate, polypropylene glycol mono(meth)acrylate and phenoxyethyl (meth) acrylate; and multifunctional acrylates or methacrylates, such as polyethylene glycol di(meth)acrylate, trimethylolethane tri(meth)acrylate, neopentyl glycol di(meth)acrylate, pentaerythrytol tri(meth)acrylate, pentaerythrytol tetra(meth) acrylate, dipentaerythrytol hexa(meth)acrylate, hexanediol (meth)acrylate, trimethylolpropane tri(acryloyloxypropyl) ether, tri(acrlyloyloxyethyl) isocyanurate, (meth)acrylate-type compounds obtained by (meth)acrylate formation after addition of ethylene oxide or propylene oxide to multi-functional alcohols, such as glycerin or trimethylolethane, urethane acrylates, polyester acrylates, epoxy acrylates which are reaction products of epoxy resins and (meth)acrylic acid, etc., can be mentioned.

In the example of the diffusion control layer 3 to which the orienting properties can be provided by the rubbing process or the like, the so-called orienting film that is commonly used for orienting the liquid crystal in the liquid crystal display device and the like can be used. Typically, such an orienting film may be formed from a polyimide material or the like. However, such a film is not critical herein.

Figure 4:
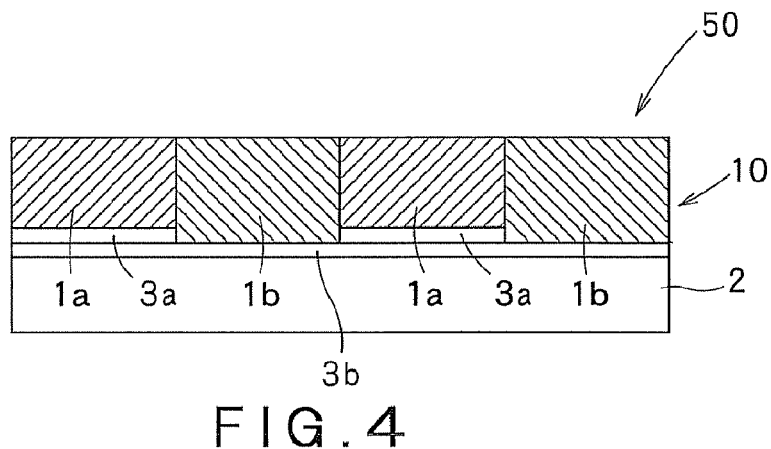
FIG. 4 is a schematic cross section showing a variation of the second embodiment of the optical diffusion device according to the present invention.

Alternatively, as shown in FIG. 4, a plurality of diffusion control layers (i.e., first diffusion control layers 3a and second diffusion control layer 3b) may be laminated on the base material 2. More specifically, as shown in FIG. 4, the second diffusion control layer 3b may be first provided on the base material 2, and then the first diffusion control layers 3a, each having different orienting properties (or diffusion controlling ability) from those of the second diffusion control layer 3b, may be provided on predetermined positions of the second diffusion control layer 3b. Consequently, since the orienting properties of the first diffusion control layers 3a are different from those of the second diffusion layer 3b, each first diffusion region 1a of the cholesteric liquid crystal polymer layer 10 arranged on each first diffusion control layer 3a will have a different diffusion angle from that of each second diffusion region 1b of the cholesteric liquid crystal polymer layer 10 arranged on the second diffusion control layer 3b.

Third Embodiment

Figure 5:
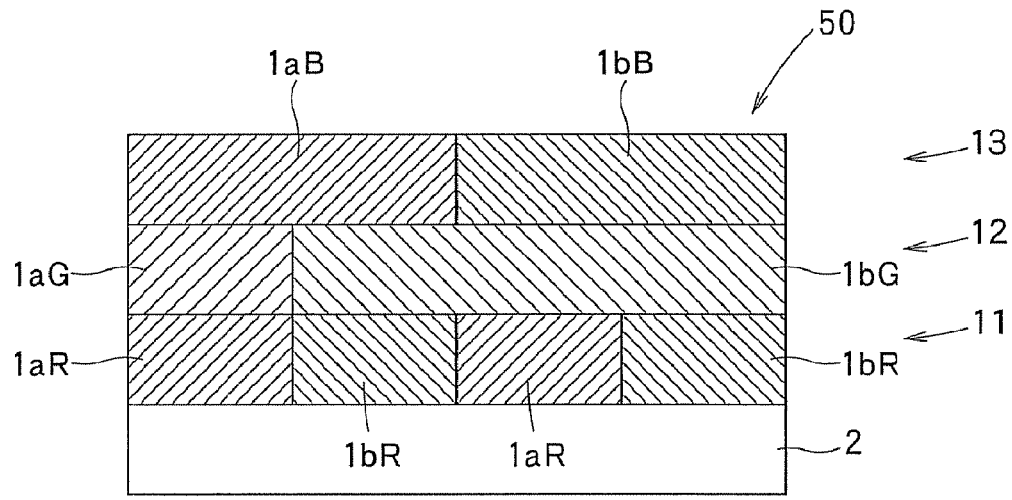
FIG. 5 is a schematic cross section showing a third embodiment of the optical diffusion device according to the present invention.
Figure 6:
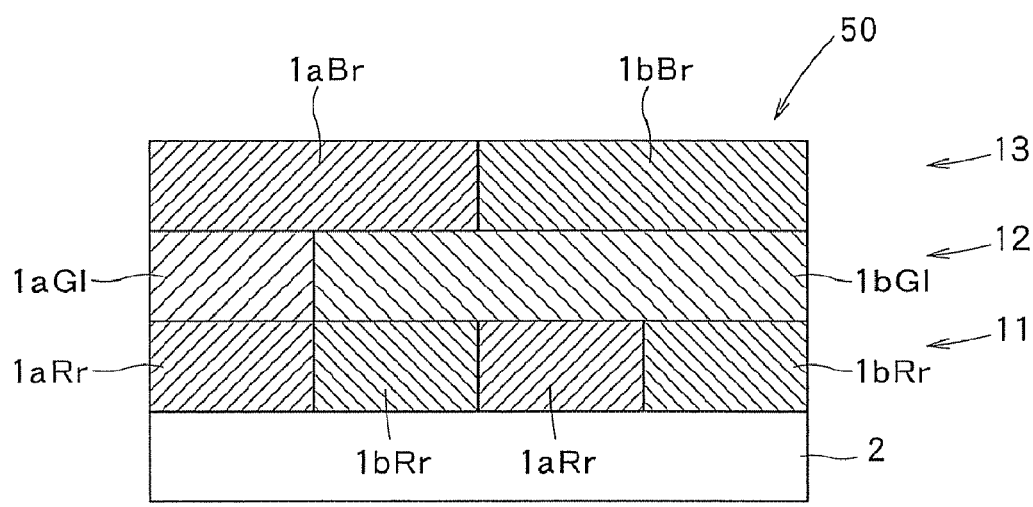
FIG. 6 is a schematic cross section showing a variation of the third embodiment of the optical diffusion device according to the present invention.

Next, a third embodiment of the present invention will be described with reference to FIGS. 5 and 6. As shown in FIGS. 5 and 6, the third embodiment includes a plurality of cholesteric liquid crystal polymer layers 11, 12, 13 arranged or laminated on one another. However, the other construction of the third embodiment is substantially the same as that of the first embodiment shown in FIGS. 1(a), 1(b) and 2. Therefore, in this embodiment, like parts in the first embodiment shown in FIGS. 1(a), 1(b) and 2 will be respectively designated by like reference numerals, and description on those parts will now be omitted.

In the third embodiment shown in FIG. 5, the plurality of cholesteric liquid crystal polymer layers (i.e., the first cholesteric liquid crystal polymer layer 11, second cholesteric liquid crystal polymer layer 12 and third cholesteric liquid crystal polymer layer 13) are laminated onto the base material 2. In this case, one of the cholesteric liquid crystal polymer layers (e.g., the first cholesteric liquid crystal polymer layer 11) is configured to diffuse and reflect light having a central wavelength different from that of another of the cholesteric liquid crystal polymer layers (e.g., the second cholesteric liquid crystal polymer layer 12 and third cholesteric liquid crystal polymer layer 13). As used herein, the term "one of the cholesteric liquid crystal polymer layers" means unspecified one cholesteric liquid crystal polymer layer, and the term "another of the cholesteric liquid crystal polymer layers" means another cholesteric liquid crystal polymer layer than the one cholesteric liquid crystal polymer layer.

For instance, as shown in FIG. 5, the first cholesteric liquid crystal polymer layer 11 is first provided on the base material 12, then the second cholesteric liquid crystal polymer layer 12 is provided onto the first cholesteric liquid crystal polymer layer 11, and finally the third cholesteric liquid crystal polymer layer 13 is provided onto the second liquid crystal polymer layer 12. Of these cholesteric liquid crystal polymer layers, the first cholesteric liquid crystal polymer layer 11 is adapted for selectively reflecting the light having the central wavelength within a range of from 430 to 470 nm, the second cholesteric liquid crystal polymer layer 12 is adapted for selectively reflecting the light having the central wavelength within the range of from 530 to 570 nm, and the third cholesteric liquid crystal polymer layer 13 is adapted for selectively reflecting the light having the central wavelength within the range of from 580 to 640 nm.

As described above, the first cholesteric liquid crystal polymer layer 11 can selectively reflect the light having the central wavelength within the range of from 430 to 470 nm, the second cholesteric liquid crystal polymer layer 12 can selectively reflect the light having the central wavelength within the range of from 530 to 570 nm, and the third cholesteric liquid crystal polymer layer 13 can selectively reflect the light having the central wavelength with the range of from 580 to 640 nm. Therefore, the first cholesteric liquid crystal polymer layer 11 can serve to reflect the light within the wavelength range corresponding to the red color (R), the second cholesteric liquid crystal polymer layer 12 can serve to reflect the light within the wavelength range corresponding to the green color (G), and the third cholesteric liquid crystal polymer layer 13 can serve to reflect the light within the wavelength range corresponding to the blue color (B).

Generally, the projector provides a color display by using three kinds of light, i.e., the three primary colors of light, within the wavelength ranges respectively corresponding to the red color (R), green color (G) and blue color (B). According to the optical diffusion device 50 of this embodiment, the three primary colors of light, i.e., the red color (R), green color (G) and blue color (B), can be reflected appropriately on the optical diffusion device 50, as such securely displaying full-color images on the screen. Therefore, the optical diffusion device 50 significantly excellent in design properties can be obtained.

The first cholesteric liquid crystal polymer layer 11 is composed of first diffusion regions 1aR and second diffusion regions 1bR respectively adapted for selectively reflecting the light having the central wavelength within the range of from 430 to 470 nm. The second cholesteric liquid crystal polymer layer 12 is composed of first diffusion regions 1aG and second diffusion regions 1bG respectively adapted for selectively reflecting the light having the central wavelength within the range of from 530 to 570 nm, and the third cholesteric liquid crystal polymer layer 13 is composed of first diffusion regions 1aB and second diffusion regions 1bB respectively adapted for selectively reflecting the light having the central wavelength within the range of from 580 to 640 nm.

In this case, only the cholesteric liquid crystal polymer layers may be laminated onto the base material 2, or otherwise each cholesteric liquid crystal polymer layer and a primer layer (not shown) may be laminated alternately one on another.

Alternatively, as shown in FIG. 6, one of the cholesteric liquid crystal polymer layers (e.g., the first cholesteric liquid crystal polymer layer 11) may be configured to diffuse and reflect light of a polarized component different from that diffused and reflected by another of the cholesteric liquid crystal polymer layers (e.g., the second cholesteric liquid crystal polymer layer 12 and third cholesteric liquid crystal polymer layer 13). In one aspect shown in FIG. 6, the first cholesteric liquid crystal polymer layer 11 and third cholesteric liquid crystal polymer layer 13 are configured to diffuse and reflect light of the same right-handed circularly-polarized component, respectively.

More specifically, the first cholesteric liquid crystal polymer layer 11 is composed of first diffusion regions 1aRr and second diffusion regions 1bRr respectively adapted for selectively reflecting the light consisting of the right-handed circularly-polarized component and having the central wavelength within the range of from 430 to 470 nm. The second cholesteric liquid crystal polymer layer 12 is composed of first diffusion regions 1aGl and second diffusion regions 1bGl respectively adapted for selectively reflecting the light consisting of a left-handed circularly-polarized component and having the central wavelength within the range of from 530 to 570 nm, and the third cholesteric liquid crystal polymer layer 13 is composed of first diffusion regions 1aBr and second diffusion regions 1bBr respectively adapted for selectively reflecting the light consisting of the right-handed circularly-polarized component and having the central wavelength within the range of from 580 to 640 nm.

Next, applications of the optical diffusion device 50 that has been discussed in each of the aforementioned embodiments will be described.

As shown in FIG. 7, the optical diffusion device 50 discussed in each of the aforementioned embodiments can be used as a reflection layer 60 for the projection screen 20 adapted for reflecting image light coming from the projector.

Since the cholesteric liquid crystal polymer layer 10 of the optical diffusion device 50 discussed in each of the aforementioned embodiments includes the first diffusion regions 1a and second diffusion regions 1b, which are different in the diffusion angle relative to one another, desired viewing angle properties for the projection screen 20 can be obtained by controlling the arrangement and ratio of these first diffusion regions 1a and second diffusion regions 1b.

Figure 8:
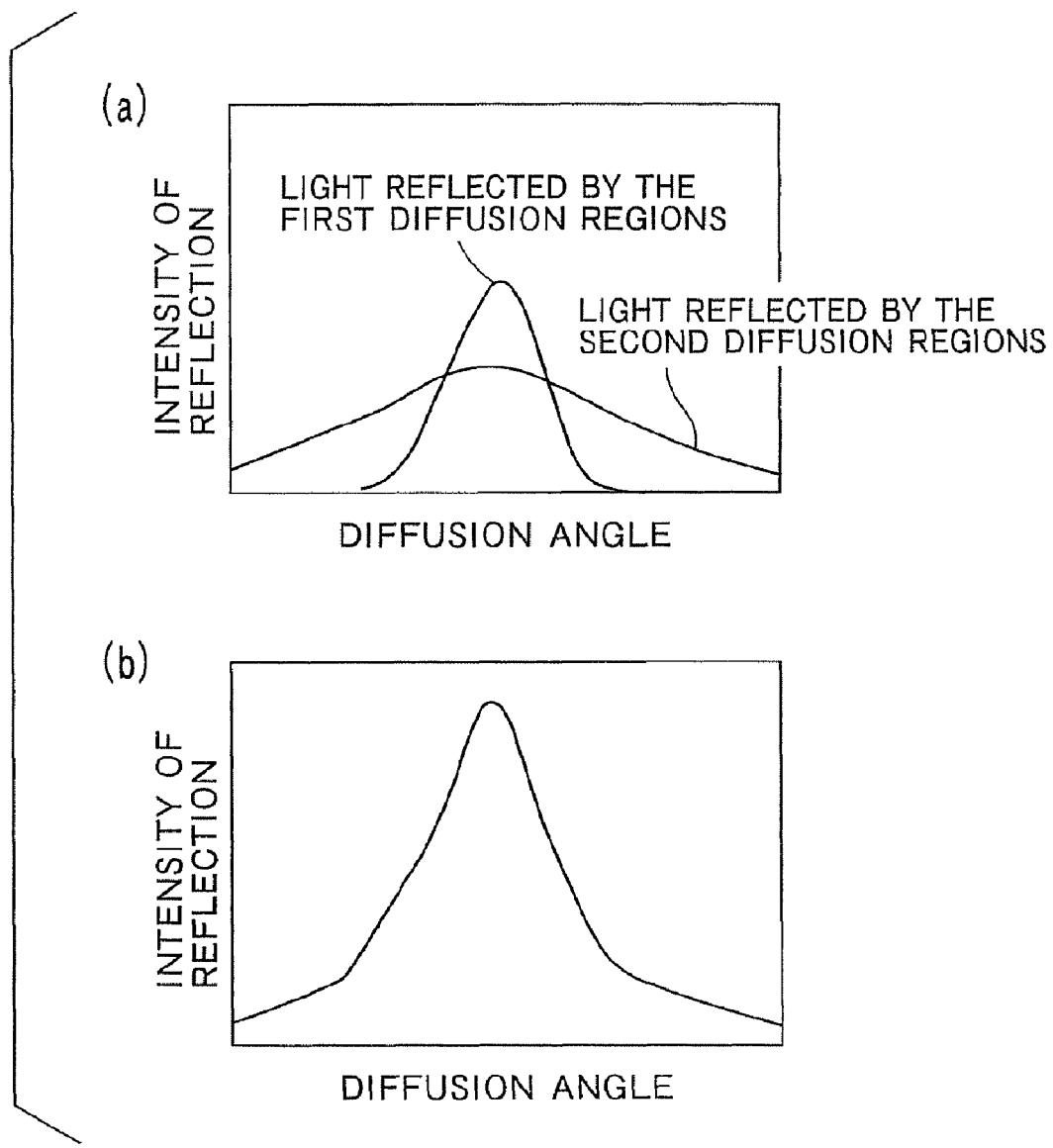
FIG. 8 is a diagram showing a relationship, between intensity of reflection and the diffusion angle, of light reflected by the optical diffusion device according to the present invention.

Namely, as shown in FIG. 8(*a*), the image light reflected by each first diffusion region 1a is strongly reflected in a front direction relative to the projection screen 20, while the image light reflected by each second diffusion region 1b is strongly reflected in a wider angular range including other directions than the front direction relative to the projection screen 20. Therefore, control in a good balance of the arrangement and ratio of the first diffusion regions 1a and second diffusion regions 1b can achieve the projection screen 20 that can display and show clear images in the front direction as well as can provide a wider viewing angle (see FIG. 8(*b*)). It is noted that FIG. 8(*a*) shows a relationship between the intensity of reflection of the light reflected by each first diffusion region 1a and the diffusion angle as well as a relationship between the intensity of reflection of the light reflected by each second diffusion region 1b and the diffusion angle. FIG. 8(*b*) shows a relationship of the sum total of the intensity of reflection of the light reflected by each first diffusion region 1a and intensity of reflection of the light reflected by each second diffusion region 1b relative to the diffusion angle.

Figure 9:
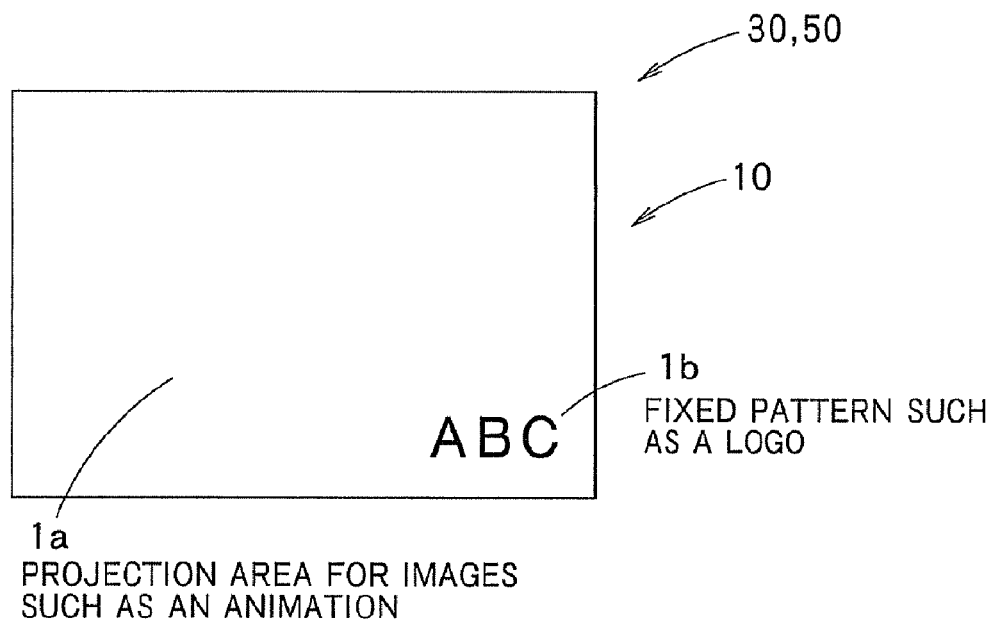
FIG. 9 is a schematic view showing the design member using the optical diffusion device according to the present invention.

As shown in FIG. 9, the optical diffusion device 50 discussed in each of the aforementioned embodiments can also be used as a design member 30 including a specific pattern for use in a screen, a signboard and the like.

As described above, the light coming in each second diffusion region 1b of the cholesteric liquid crystal polymer layer 10 is diffused by the same diffusion region 1b at a greater diffusion angle than that at which the light coming in each first diffusion region 1a is diffused by the same diffusion region 1a. Therefore, for example, as shown in FIG. 9, when the second diffusion regions 1b are provided in a pattern of English letters "ABC", the letters "ABC" will appear as standing out from the first diffusion regions 1a of the cholesteric liquid crystal polymer layer 10.

As discussed above, various letters and/or figures can be displayed, with significantly enhanced design properties and improved visual properties, by providing the second diffusion regions 1b of the cholesteric liquid crystal polymer layer 10 in a pattern or patterns of such letters and/or figures.

Figure 10:
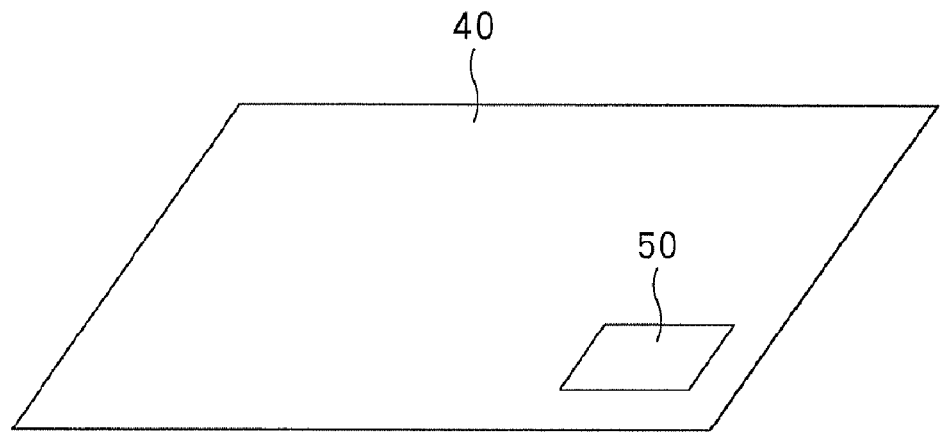
FIG. 10 is a schematic view showing the security medium using the optical diffusion device according to the present invention.

Additionally, the optical diffusion device 50 discussed in each of the aforementioned embodiments can be used for a security medium, such as a card 40 and the like, as shown in FIG. 10.

As shown in FIG. 10, in the case in which the optical diffusion device 50 is provided in the card 40, the diffusion device 50 will exhibit polarizing properties in this card 40. Therefore, when the card 40 is seen through a polarizing plate, reflected colors can be eliminated over the whole surface of the optical diffusion device 50. Accordingly, whether the card 40 is genuine one or not can be determined in this manner.

Furthermore, the optical diffusion device 50 can also be applied to other products and/or packages than the card 40. Again, as with the card 40, when such a product or package is seen through the polarizing plate, the reflected colors can be eliminated over the whole surface of the optical diffusion device 50. Therefore, whether or not these products and/or packages are genuine ones can be determined. Accordingly, in the case in which the optical diffusion device 50 is provided or incorporated in these products and/packages, such a product or package itself can be used as the security medium.

EXAMPLES

As described above, the term "one of the diffusion regions" means unspecified one group of the diffusion regions, and the term "another of the diffusion regions" means another group of the diffusion regions than the one group of the diffusion regions. In addition, in examples described below, the first diffusion regions, in some cases, will be shown and described as the first diffusion regions 1a and the second diffusion regions be shown and described as the second diffusion regions 1b, while in other cases, the first diffusion regions may be shown and described as the second diffusion regions 1b and the second diffusion regions be shown and described as the first diffusion regions 1a. It should be noted that the relation between the diffusion angle a of each first diffusion region 1a and the diffusion angle b of each second diffusion region b is expressed by b>a≧0.

Example 1

Figure 11:
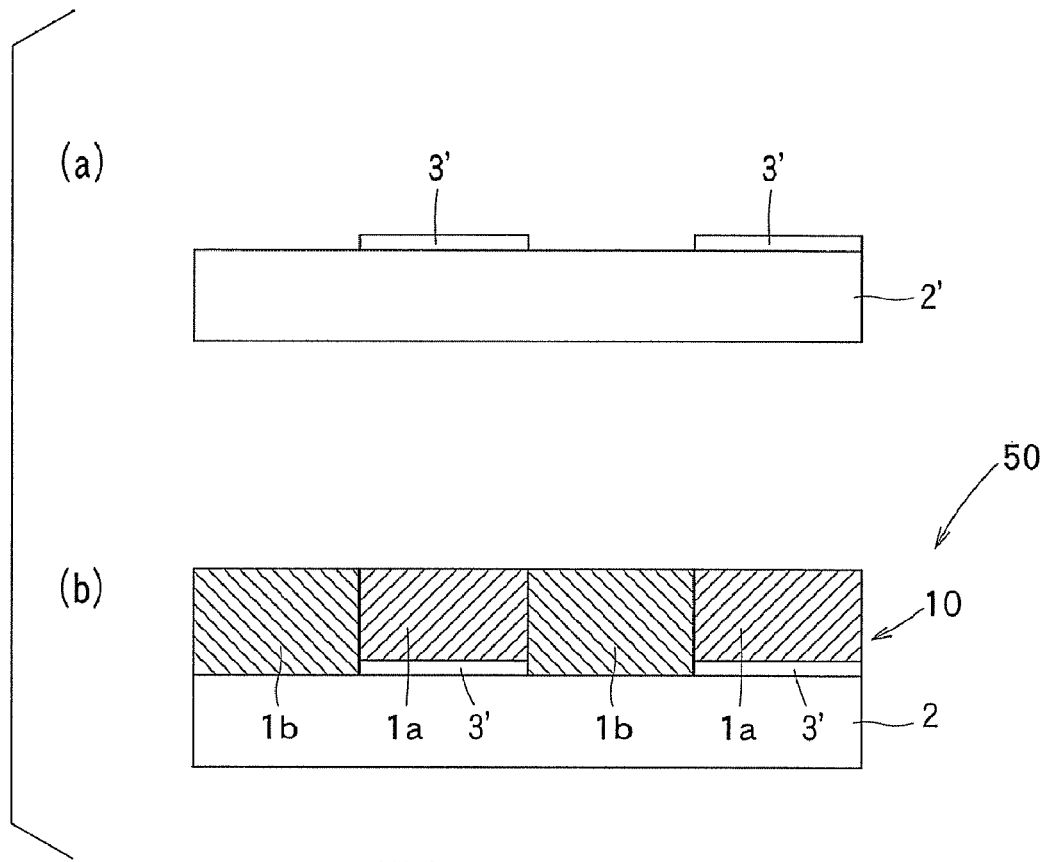
FIG. 11 is a schematic cross section showing Example 1 of the optical diffusion device according to the present invention.

This example is described as the optical diffusion device 50, in which PETA layers (diffusion control layers) 3', each adapted for controlling the diffusion angle of the first diffusion regions (one of the diffusion regions) 1a, are located at portions respectively corresponding to the first diffusion regions 1a, between a glass substrate (i.e., base material) 2' and the cholesteric liquid crystal polymer layer 10 (see FIGS. 11(a), 11(b)).

First, a monomer liquid crystal mixture prepared by adding a chiral agent (3% by weight) and a surfactant (0.050% by weight) into a base material (97% by weight) consisting of a UV-curing nematic liquid crystal was dissolved in cyclohexanone, so as to prepare a first cholesteric liquid crystal solution having a central wavelength of selective reflection at 550 nm. Subsequently, a PETA (pentaerythrytol tri(meth)acrylate) solution was coated on the glass substrate 2', subjected to a drying process, and then partially exposed to UV light (ultraviolet rays) through a photomask, thereby to obtain the PETA layers 3' respectively formed from only portions of the PETA solution cured by irradiation of the UV light. Thereafter, uncured portions of the PETA solution were removed with an organic solvent, thus obtaining a patterned PETA layer 3' (see FIG. 11(a)).

Thereafter, the first cholesteric liquid crystal solution prepared as described above was coated, by die coating, onto the 100 mm×100 mm glass substrate 2' (1 mm thickness) already having the PETA layers 3' provided thereon (see FIG. 11(b)). The first cholesteric liquid crystal solution was then heated and dried, for 90 seconds in an 80° C. oven, thereby obtaining the cholesteric liquid crystal polymer layer 10 from which the solvent was removed (see FIG. 11(b)). Subsequently, the cholesteric liquid crystal polymer layer 10 was further kept at 80° C. for one minute. Thereafter, the cholesteric liquid crystal polymer layer 10 was irradiated with 365 nm UV rays at 10 mW/cm², for one minute, under a nitrogen atmosphere at a room temperature, so as to cure the polymer layer 10. Consequently, the optical diffusion device 50, which can reflect the green color component of light with the central wavelength of selective reflection at 550 nm, was obtained (see FIG. 1b). This optical diffusion device 50 has narrower diffusion properties (a=±20°) in each first diffusion region 1a coated on each PETA layer 3', while having wider diffusion properties (b=±35°) in each second diffusion region 1b directly coated on the glass substrate 2'. Namely, while the regions respectively corresponding to the narrower diffusion properties (i.e., the first diffusion regions 1a) can be seen brightly when the optical diffusion device 50 is viewed in the front direction, the regions respectively corresponding to the wider diffusion properties (i.e., the second diffusion regions 1b) will be seen brightly when the device 50 is viewed in a relatively oblique direction. Thus, significantly clear visual confirmation can be provided. In addition, when the optical diffusion device 50 is viewed through a polarizing plate, the reflected colors can be eliminated over the whole surface, thereby confirming adequate polarizing properties of the device 50.

Example 2

Figure 12:
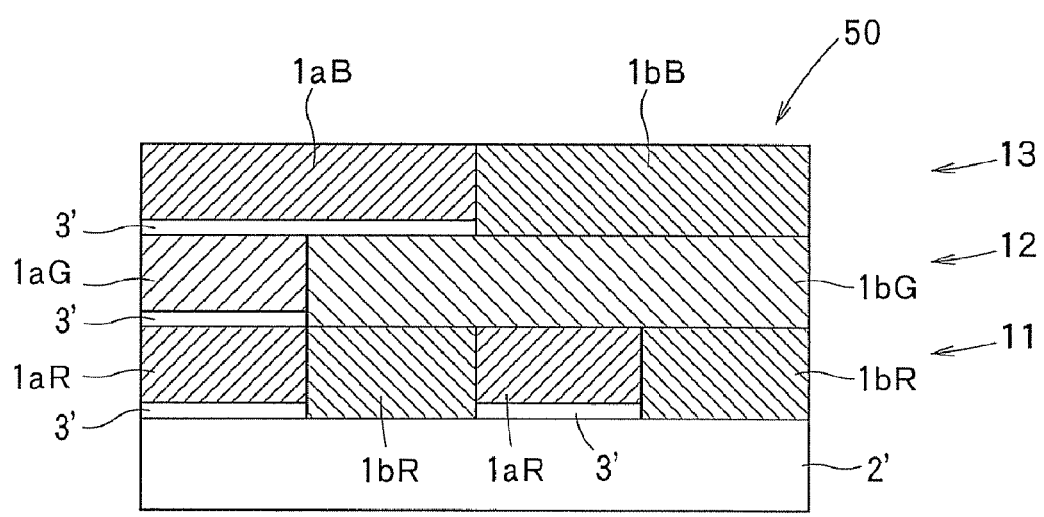
FIG. 12 is a schematic cross section showing Example 2 of the optical diffusion device according to the present invention.

This example is described as the optical diffusion device 50, in which the plurality of cholesteric liquid crystal polymer layers 11, 12, 13 are laminated, one on another, over the glass substrate 2'. This optical diffusion device 50 includes the PETA layers 3' each located at a portion corresponding to one of the diffusion regions (e.g., the first diffusion region 1aG) located between one of the cholesteric liquid crystal polymers (e.g., the first cholesteric liquid crystal polymer layer 11) and another of the cholesteric liquid crystal polymer layers (e.g., the second cholesteric liquid crystal polymer layer 12), and adapted for controlling the diffusion angle of the one of the diffusion regions (i.e., the first diffusion region 1aG) (see FIG. 12).

First, a monomer liquid crystal mixture prepared by adding the chiral agent (3% by weight) and the surfactant (0.15% by weight) into the base material (97% by weight) consisting of the UV-curing nematic liquid crystal was dissolved in cyclohexanone, so as to prepare the first cholesteric liquid crystal solution having the central wavelength of selective reflection at 550 nm. Thereafter, the first cholesteric liquid crystal solution prepared as described above was coated, by die coating, onto the 500 mm×500 mm glass substrate 2' (1 mm thickness) already having the patterned PETA layer 3' provided thereon. The pattern of the PETA layer 3' was a stripe pattern with a 0.3 mm width. Then, the first cholesteric liquid crystal solution was heated and dried, for 90 seconds in an 80° C. oven, thereby obtaining the cholesteric liquid crystal polymer layer 11 from which the solvent was removed (see FIG. 12).

Subsequently, the cholesteric liquid crystal polymer layer 11 was heated, for orientation, for one minute at 80° C. Thereafter, the cholesteric liquid crystal polymer layer 11 was irradiated with 365 nm UV rays at 10 mW/cm², for one minute, under a nitrogen atmosphere at a room temperature, so as to cure the polymer layer 11. In this manner, the first cholesteric liquid crystal polymer layer 11 was obtained, as a first layer, having the central wavelength of selective reflection at 600 nm (see FIG. 12). The so-obtained first cholesteric liquid crystal polymer layer 11 exhibited such diffusion properties that the diffusion angle a of each first diffusion region 1aR of the first cholesteric liquid crystal polymer layer 11 on each PETA layer 3' was ±20°, while the diffusion angle b of each second diffusion region 1bR of the first cholesteric liquid crystal polymer layer 11 on the glass substrate was ±35°.

Next, the PETA layer 3' was formed again, by patterning, on the first cholesteric liquid crystal polymer layer 11, and a second cholesteric liquid crystal solution was directly coated thereon in the same manner. Further, a drying process, an orienting process and a curing process were provided to the second cholesteric liquid crystal solution, similarly to the case of the first cholesteric liquid crystal polymer layer 11. Consequently, the second cholesteric liquid crystal polymer layer 12 was obtained, as a second layer, having the central wavelength of selective reflection at 550 nm (see FIG. 12). It should be appreciated that the second cholesteric liquid crystal solution was prepared in the same manner as with the first cholesteric liquid crystal solution, and that the central wavelength of selective reflection at 550 nm was obtained by controlling the ratio of mixing the nematic liquid crystal and the chiral agent.

Next, the PETA layer 3' was formed again, by patterning, on the second cholesteric liquid crystal polymer layer 12, and a third cholesteric liquid crystal solution was directly coated thereon, in the same manner, and then the drying process, orienting process and curing process were conducted similarly. Consequently, the third cholesteric liquid crystal polymer layer 13 was obtained, as a third layer, having the central wavelength of selective reflection at 440 nm (see FIG. 12). It should be appreciated that the third cholesteric liquid crystal solution was prepared in the same manner as with the first cholesteric liquid crystal solution, and that the central wavelength of selective reflection at 440 nm was obtained by controlling the ratio of mixing the nematic liquid crystal with the chiral agent.

As a result, the optical diffusion device 50 was obtained, in which the first cholesteric liquid crystal polymer layer 11 (5 μm thickness) as the first layer adapted for selectively reflecting the light within the wavelength range of the red color (R) (i.e., the light having the central wavelength of selective reflection at 600 nm), second cholesteric liquid crystal polymer layer 12 (4 μm thickness) as the second layer adapted for selectively reflecting the light within the wavelength range of the green color (G) (i.e., the light having the central wavelength of selective reflection at 550 nm) and third cholesteric liquid crystal polymer layer 13 (3 μm thickness) as the third layer adapted for selectively reflecting the light within the wavelength range of the blue color (B) (i.e., the light having the central wavelength of selective reflection at 440 nm) are laminated, in succession, from the glass substrate 2'. We have found that the projection screen 20 including the optical diffusion device 50 obtained as described above can reflect the light, respectively inputted into the first diffusion regions 1aR, 1aG, 1aB of the first cholesteric liquid crystal polymer layer 11, second cholesteric liquid crystal polymer layer 12 and third cholesteric liquid crystal polymer layer 13, at the diffusion angle of a=±20°, as well as can reflect the light, respectively inputted into the second diffusion regions 1bR, 1bG, 1bB, at the diffusion angle of b=±35° (see FIG. 12). Accordingly, when an image was projected onto the projection screen 20, a significantly clear and bright image was obtained in an approximately front direction relative to the screen, as well as a relatively clear and bright image was obtained in an oblique viewing angle relative to the screen.

Example 3

Figure 13:
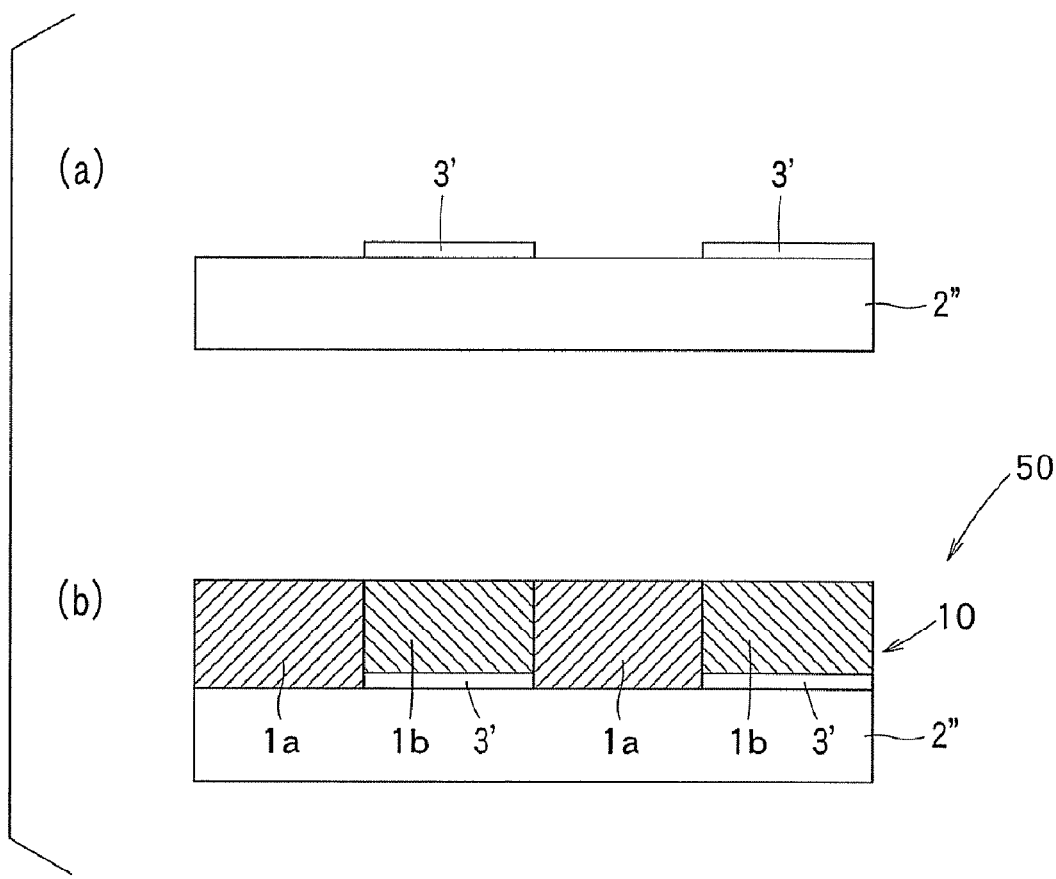
FIG. 13 is a schematic cross section showing Example 3 of the optical diffusion device according to the present invention.

This example is described as the optical diffusion device 50, in which the PETA layers 3', each adapted for controlling the diffusion angle of the second diffusion regions 1b (one of the diffusion regions), are located at portions respectively corresponding to the second diffusion regions 1b, between a non-oriented PET substrate (or base material) 2" and the cholesteric liquid crystal polymer layer 10 (see FIGS. 13(a), 13(b)).

First, the monomer liquid crystal mixture prepared by adding the chiral agent (3% by weight) and the surfactant (0.15% by weight) into the base material (97% by weight) consisting of the UV-curing nematic liquid crystal was dissolved in cyclohexanone, so as to prepare the first cholesteric liquid crystal solution having the central wavelength of selective reflection at 550 nm. Thereafter, the PETA solution was printed with a pattern, by gravure printing, on the 100 μm non-oriented PET substrate 2", dried for two minutes at 90° C., and then cured by UV-irradiation. In this manner, the 1 μm PETA layers 3', each partially covering the substrate 2", were obtained (see FIG. 13(a)).

Thereafter, the first cholesteric liquid crystal solution prepared as described above was coated, by die coating, onto the PET substrate 2" as well as onto each PETA layer 3' partially formed on the PET substrate 2" (see FIG. 13(b)). Subsequently, the first cholesteric liquid crystal solution was heated, for 90 seconds in an 80° C. oven, and then subjected to a drying process, thereby to obtain the cholesteric liquid crystal polymer layer 10 from which the solvent was removed (see FIG. 13(b)). Thereafter, the cholesteric liquid crystal polymer layer 10 was further kept at 80° C. for one minute. Then, the cholesteric liquid crystal polymer layer 10 was irradiated with 365 nm UV rays at 10 mW/cm$^2$, for one minute, under a nitrogen atmosphere at a room temperature, so as to cure the polymer layer 10. Consequently, the optical diffusion device 50, which can reflect the green color component of light with the central wavelength of selective reflection at 550 nm, was obtained (see FIG. 13(b)). In this case, when light is inputted from a light source into the optical diffusion device 50, the light is diffused and reflected by each second diffusion region 1b coated on each PETA layer 3', while mirror-reflected by each first diffusion region 1a directly coated on the PET substrate 2". Namely, when the optical diffusion device 50 is viewed in the regular reflection direction relative to the light source, each first diffusion region 1a by which the light is mirror-reflected can be brightly seen, while when the optical diffusion device 50 is viewed in an oblique direction, each second diffusion region 1b by which the light is diffused and reflected will be brightly seen, thereby creating a significantly clear pattern. In addition, when the optical diffusion device 50 is seen through a polarizing plate, reflected colors can be eliminated over the whole surface thereof. Accordingly, adequate polarizing properties of the optical diffusion device 50 can be confirmed.

Example 4

Figure 14:
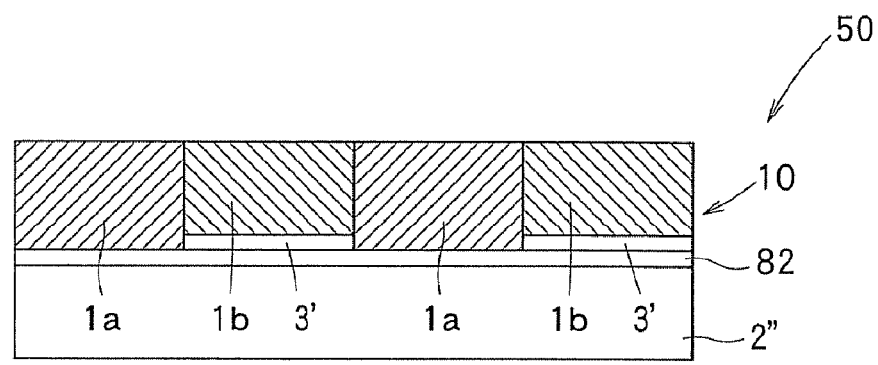
FIG. 14 is a schematic cross section showing Example 4 of the optical diffusion device according to the present invention.

This example is described as the optical diffusion device 50, in which an orienting film 82 subjected to a rubbing process is provided between the non-oriented PET substrate 2" and the cholesteric liquid crystal polymer layer 10, and in which the PETA layers 3', each adapted for controlling the diffusion angle of the second diffusion regions 1b (one of the diffusion regions), are located at portions respectively corresponding to the second diffusion regions 1b on the orienting film 82 (see FIG. 14).

First, the monomer liquid crystal mixture prepared by adding the chiral agent (3% by weight) and the surfactant (0.15% by weight) into the base material (97% by weight) consisting of the UV-curing nematic liquid crystal was dissolved in cyclohexanone, so as to prepare the first cholesteric liquid crystal solution with the central wavelength of selective reflection at 550 nm. Thereafter, the orienting film 82 consisting of polyimide was coated on the 100 μm non-oriented PET substrate 2" and then dried at 100° C. for 2 minutes, so as to form a 1 μm film (see FIG. 14). Thereafter, the rubbing process is provided, by using a rubbing roll, over the whole surface of the orienting film 82, thereby to provide a rubbing face thereon. Subsequently, the PETA solution was printed with a pattern, by gravure printing, on the so-formed rubbing face, dried for two minutes at 90° C., and then cured by UV-irradiation. In this manner, the 1 μm PETA layers 3', each partially covering the substrate 2", were obtained (see FIG. 14).

Thereafter, the first cholesteric liquid crystal solution prepared as described above was coated, by die coating, on the rubbing face as well as on each PETA layer 3' partially formed on the rubbing face (see FIG. 14). Subsequently, the first cholesteric liquid crystal solution was heated, for 90 seconds in an 80° C. oven, and then subjected to the drying process, thereby to obtain the cholesteric liquid crystal polymer layer 10 from which the solvent was removed (see FIG. 14). Thereafter, the cholesteric liquid crystal polymer layer 10 was further kept at 80° C. for one minute. Then, the cholesteric liquid crystal polymer layer 10 was irradiated with 365 nm UV rays at 10 mW/cm$^2$, for one minute, under a nitrogen atmosphere at a room temperature, so as to cure the polymer layer 10. Consequently, the optical diffusion device 50, which can reflect the green color component of light with the central wavelength of selective reflection at 550 nm, was obtained (see FIG. 14). In this case, when light is inputted from a light source into the optical diffusion device 50, the light is diffused and reflected by each second diffusion region 1b coated on each PETA layer 3', while mirror-reflected by each first diffusion region 1a directly coated on the rubbing face of the orienting film 82. Namely, when the optical diffusion device 50 is viewed in the regular reflection direction relative to the light source, each first diffusion region 1a by which the light is mirror-reflected can be brightly seen, while when the optical diffusion device 50 is viewed in an oblique direction, each second diffusion region 1b by which the light is diffused and reflected will be brightly seen, thereby providing a significantly clear pattern. In addition, when seen through a polarizing plate, the optical diffusion device 50 can eliminate reflected colors over the whole surface thereof, as such exhibiting adequate polarizing properties.

Example 5

This example is described as the optical diffusion device 50, in which an adhesion-facilitating process is provided to the surface of the non-oriented PET substrate 2" (hereinafter, the PET substrate 2" will be referred to as the PET substrate 2e"), on the side of the cholesteric liquid crystal polymer layer 10, in order to provide adhesion-facilitating properties to the substrate 2e", and in which the PETA layers 3', each adapted for controlling the diffusion angle of the first diffusion regions 1a (one of the diffusion regions), are located at portions respectively corresponding to the first diffusion regions 1a on the PET substrate 2e" (see FIG. 15).

First, the monomer liquid crystal mixture prepared by adding the chiral agent (3% by weight) and the surfactant (0.05% by weight) into the base material (97% by weight) consisting of the UV-curing nematic liquid crystal was dissolved in cyclohexanone, so as to prepare the first cholesteric liquid crystal solution having the central wavelength of selective reflection at 550 nm. Thereafter, the PETA solution was printed with a pattern, by gravure printing, on the 100 μm PET substrate 2e" to which the adhesion-facilitating process was already provided, dried for two minutes at 90° C., and then cured by UV-irradiation. In this manner, the 1 μm PETA layers 3', each partially covering the substrate 2e", were obtained (see FIG. 15).

Figure 15:
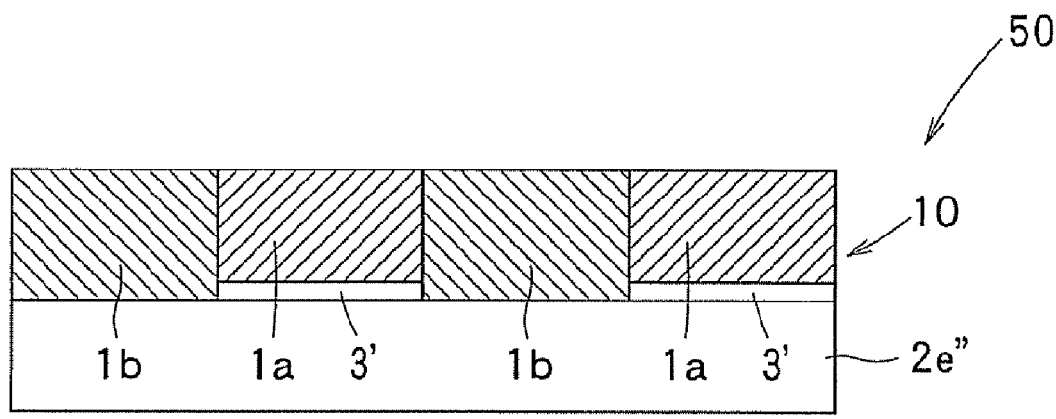
FIG. 15 is a schematic cross section showing Example 5 of the optical diffusion device according to the present invention.

Thereafter, the first cholesteric liquid crystal solution prepared as described above was coated, by die coating, on the PET substrate 2e" as well as on each PETA layer 3' formed on the PET substrate 2e" (see FIG. 15). Subsequently, the first cholesteric liquid crystal solution was heated, for 90 seconds in an 80° C. oven, and then subjected to the drying process, thereby to obtain the cholesteric liquid crystal polymer layer 10 from which the solvent was removed (see FIG. 15). Thereafter, the cholesteric liquid crystal polymer layer 10 was further kept at 80° C. for one minute. Then, the cholesteric liquid crystal polymer layer 10 was irradiated with 365 nm UV rays at 10 mW/cm$^2$, for one minute, under a nitrogen atmosphere at a room temperature, so as to cure the polymer layer 10. Consequently, the optical diffusion device 50, which can reflect the green color component of light with the central wavelength of selective reflection at 550 nm, was obtained (see FIG. 15). This optical diffusion device 50 has the narrower diffusion properties in each first diffusion region 1a coated on each corresponding PETA layer 3', while having the wider diffusion properties in each second diffusion region 1b directly coated on the PET substrate 2e". Namely, when the optical diffusion device 50 is viewed in the regular reflection direction relative to the light source, each first diffusion region 1a by which the light is subjected to narrower diffusion reflection can be brightly seen, while when the optical diffusion device 50 is viewed in an oblique direction, each second diffusion region 1b by which the light is subjected to wider diffusion reflection will be brightly seen, thereby creating a significantly clear pattern. In addition, when seen through a polarizing plate, the optical diffusion device 50 can eliminate reflected colors over the whole surface thereof, as such exhibiting adequate polarizing properties.

Example 6

Figure 16:
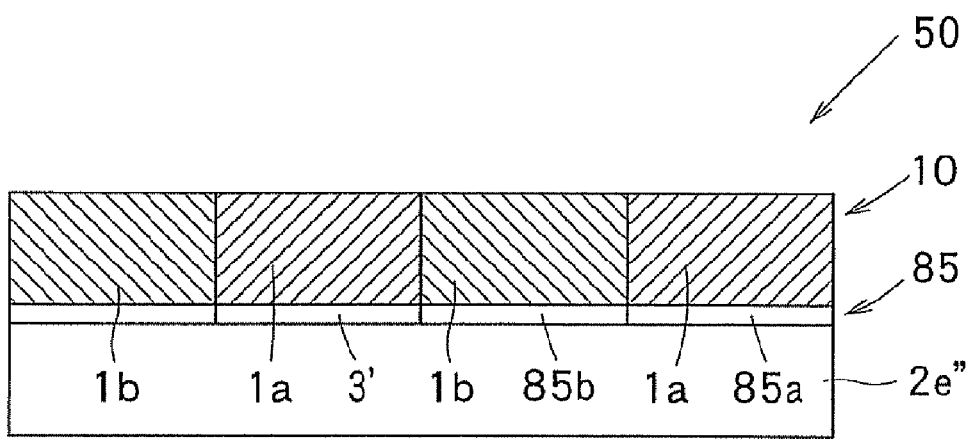
FIG. 16 is a schematic cross section showing Example 6 of the optical diffusion device according to the present invention.

This example is described as the optical diffusion device 50, in which an optically anisotropic layer 85 is provided between the PET substrate 2e" having been subjected to the adhesion-facilitating process at its surface on the side of cholesteric liquid crystal polymer layer 10 and the cholesteric liquid crystal polymer layer 10, and in which portions 85a of the optically anisotropic layer 85, respectively corresponding to the first diffusion regions 1a (one of the diffusion regions), are exposed to light (see FIG. 16).

First, the monomer liquid crystal mixture prepared by adding the chiral agent (3% by weight) and the surfactant (0.15% by weight) into the base material (97% by weight) consisting of the UV-curing nematic liquid crystal was dissolved in cyclohexanone, so as to prepare the first cholesteric liquid crystal solution having the central wavelength of selective reflection at 550 nm. Thereafter, the 100 nm optically anisotropic layer 85 was coated on the 100 μm PET substrate 2e" having been subjected to the adhesion-facilitating process. Then, the optically anisotropic layer 85 was dried and exposed to UV light that was partially polarized via a photomask (see FIG. 16). Subsequently, the optically anisotropic layer 85 was dried for two minutes at 90° C., and then cured by UV-irradiation (see FIG. 16).

Thereafter, the first cholesteric liquid crystal solution prepared as described above was coated, by die coating, onto the optically anisotropic layer 85 (see FIG. 16). Subsequently, the first cholesteric liquid crystal solution was heated, for 90 seconds in an 80° C. oven, and then subjected to the drying process, thereby to obtain the cholesteric liquid crystal polymer layer 10 from which the solvent was removed (see FIG. 16). Thereafter, the cholesteric liquid crystal polymer layer 10 was further kept at 80° C. for one minute. Then, the cholesteric liquid crystal polymer layer 10 was irradiated with 365 nm UV rays at 10 mW/cm$^2$, for one minute, under a nitrogen atmosphere at a room temperature, so as to cure the polymer layer 10. Consequently, the optical diffusion device 50, which can reflect the green color component of light with the central wavelength of selective reflection at 550 nm, was obtained (see FIG. 16). This optical diffusion device 50 has the narrower diffusion properties in each first diffusion region 1a coated on each corresponding exposed portion 85a of the optically anisotropic layer 85, while having the wider diffusion properties in each second diffusion region 1b coated on each corresponding portion 85b of the optically anisotropic layer 85, which was not exposed via the photomask. Namely, when the optical diffusion device 50 is viewed in the regular reflection direction relative to the light source, each first diffusion region 1a by which the light is subjected to narrower diffusion reflection can be brightly seen, while when the optical diffusion device 50 is viewed in an oblique direction, each second diffusion region 1b by which the light is subjected to wider diffusion reflection will be brightly seen, thereby creating a significantly clear pattern. In addition, when seen through a polarizing plate, the optical diffusion device 50 can eliminate reflected colors over the whole surface thereof, as such exhibiting adequate polarizing properties.

The invention claimed is:

1. An optical diffusion device, comprising:
    a base material; and
    a cholesteric liquid crystal polymer layer provided on the base material and composed of a plurality of diffusion regions arranged on a plane;
    wherein the cholesteric liquid crystal polymer layer contains a large number of spiral liquid crystal domains; and
    wherein a diffusion angle of a first diffusion region of the cholesteric liquid crystal polymer layer is different from a diffusion angle of a second diffusion region, which selectively reflects light of the same particular wavelength as that of the first diffusion region, because a direction and a degree of scattering of an axis of spiral liquid crystal domains of the first diffusion region of the cholesteric liquid crystal polymer layer is different from a direction and a degree of scattering of an axis of spiral liquid crystal domains of the second diffusion region of the cholesteric liquid crystal polymer layer, and the second diffusion region is provided in a pattern so that the second diffusion region appears as standing out from the first diffusion region.

2. The optical diffusion device according to claim 1, wherein the diffusion regions of the cholesteric liquid crystal polymer layer are created by providing a process for changing diffusion controlling ability of the base material to portions, corresponding to the diffusion regions, in the base material, prior to providing the cholesteric liquid crystal polymer layer on the portions.

3. The optical diffusion device according to claim 1, wherein the diffusion regions of the cholesteric liquid crystal polymer layer are created by providing a process for changing a diffusion angle of the cholesteric liquid crystal polymer layer to portions, corresponding to the diffusion regions, in the cholesteric liquid crystal polymer layer provided on the base material.

4. The optical diffusion device according to claim 1, further comprising a diffusion control layer located between the base material and the cholesteric liquid crystal polymer layer, and adapted for controlling the diffusion angle of the diffusion regions.

5. The optical diffusion device according to claim 4, wherein a plurality of diffusion control layers are laminated between the base material and the cholesteric liquid crystal polymer layer.

6. The optical diffusion device according to claim 5, wherein the diffusion controlling ability of the laminated diffusion control layers is different relative to one another.

7. The optical diffusion device according to claim 1, further comprising a diffusion control layer located at portions corresponding to the first diffusion region, between the base material and the cholesteric liquid crystal polymer layer, and adapted for controlling the diffusion angle of the diffusion regions.

8. The optical diffusion device according to claim 7, wherein a plurality of diffusion control layers are laminated between the base material and the cholesteric liquid crystal polymer layer.

9. The optical diffusion device according to claim 1, wherein a plurality of cholesteric liquid crystal polymer layers are laminated.

10. The optical diffusion device according to claim 9, wherein one of the cholesteric liquid crystal polymer layers is adapted for diffusing and reflecting light having a central wavelength different from a central wavelength diffused and reflected by another of the cholesteric liquid crystal polymer layers.

11. The optical diffusion device according to claim 9, wherein one of the cholesteric liquid crystal polymer layers is adapted for diffusing and reflecting light of a polarized component different from a polarized component diffused and reflected by another of the cholesteric liquid crystal polymer layers.

12. The optical diffusion device according to claim 9, further comprising a diffusion control layer located between one of the cholesteric liquid crystal polymer layers and another of the cholesteric liquid crystal polymer layers, and adapted for controlling the diffusion angle of the diffusion regions.

13. The optical diffusion device according to claim 9, further comprising the diffusion control layer located at portions corresponding to the first diffusion region, between the one of the cholesteric liquid crystal polymer layers and another of the cholesteric liquid crystal polymer layers, and adapted for controlling the diffusion angle of the diffusion regions.

14. The optical diffusion device according to claim 1, further comprising an orienting film located between the base material and the cholesteric liquid crystal polymer layer, and subjected to a rubbing process.

15. The optical diffusion device according to claim 1, wherein an adhesion-facilitating process is provided to a surface of the base material on the side of the cholesteric liquid crystal polymer layer, so that the surface of the base material can exhibit adhesion-facilitating properties.

16. The optical diffusion device according to claim 1, further comprising an optically anisotropic layer located between the base material and the cholesteric liquid crystal polymer layer, and including portions, corresponding to the first diffusion region, exposed to light.

17. A projection screen including an optical diffusion device,
    wherein the optical diffusion device comprises:
    a base material; and
    a cholesteric liquid crystal polymer layer provided on the base material and composed of a plurality of diffusion regions arranged on a plane;
    wherein the cholesteric liquid crystal polymer layer contains a large number of spiral liquid crystal domains; and
    wherein a diffusion angle of a first diffusion region of the cholesteric liquid crystal polymer layer is different from a diffusion angle of a second diffusion region, which selectively reflects light of the same particular wavelength as that of the first diffusion region, because a direction and a degree of scattering of an axis of spiral liquid crystal domains of the first diffusion region of the cholesteric liquid crystal polymer layer is different from a direction and a degree of scattering of an axis of spiral liquid crystal domains of the second diffusion region of the cholesteric liquid crystal polymer layer, and the second diffusion region is provided in a pattern so that the second diffusion region appears as standing out from the first diffusion region.

18. A design member including an optical diffusion device, wherein the optical diffusion device comprises:

a base material; and a cholesteric liquid crystal polymer layer provided on the base material and composed of a plurality of diffusion regions arranged on a plane;

wherein the cholesteric liquid crystal polymer layer contains a large number of spiral liquid crystal domains;

wherein a diffusion angle of a first diffusion region of the cholesteric liquid crystal polymer layer is different from a diffusion angle of a second diffusion region, which selectively reflects light of the same particular wavelength as that of the first diffusion region, because a direction and a degree of scattering of an axis of spiral liquid crystal domains of the first diffusion region of the cholesteric liquid crystal polymer layer is different from a direction and a degree of scattering of an axis of spiral liquid crystal domains of the second diffusion region of the cholesteric liquid crystal polymer layer, and the second diffusion region is provided in a pattern so that the second diffusion region appears as standing out from the first diffusion region.

19. A security medium including an optical diffusion device, wherein the optical diffusion device comprises a base material; and a cholesteric liquid crystal polymer layer provided on the base material and composed of a plurality of diffusion regions arranged on a plane;

wherein the cholesteric liquid crystal polymer layer contains a large number of spiral liquid crystal domains; and wherein a diffusion angle of a first diffusion region of the cholesteric liquid crystal polymer layer is different from a diffusion angle of a second diffusion region, which selectively reflects light of the same particular wavelength as that of the first diffusion region, because a direction and a degree of scattering of an axis of spiral liquid crystal domains of the first diffusion region of the cholesteric liquid crystal polymer layer is different from a direction and a degree of scattering of an axis of spiral liquid crystal domains of the second diffusion region of the cholesteric liquid crystal polymer layer, and the second diffusion region is provided in a pattern so that the second diffusion region appears as standing out from the first diffusion region.

* * * * *